July 1, 1958     R. B. TROUSDALE     2,841,651
TELEPHONE SYSTEM
Filed Jan. 27, 1954     25 Sheets-Sheet 2
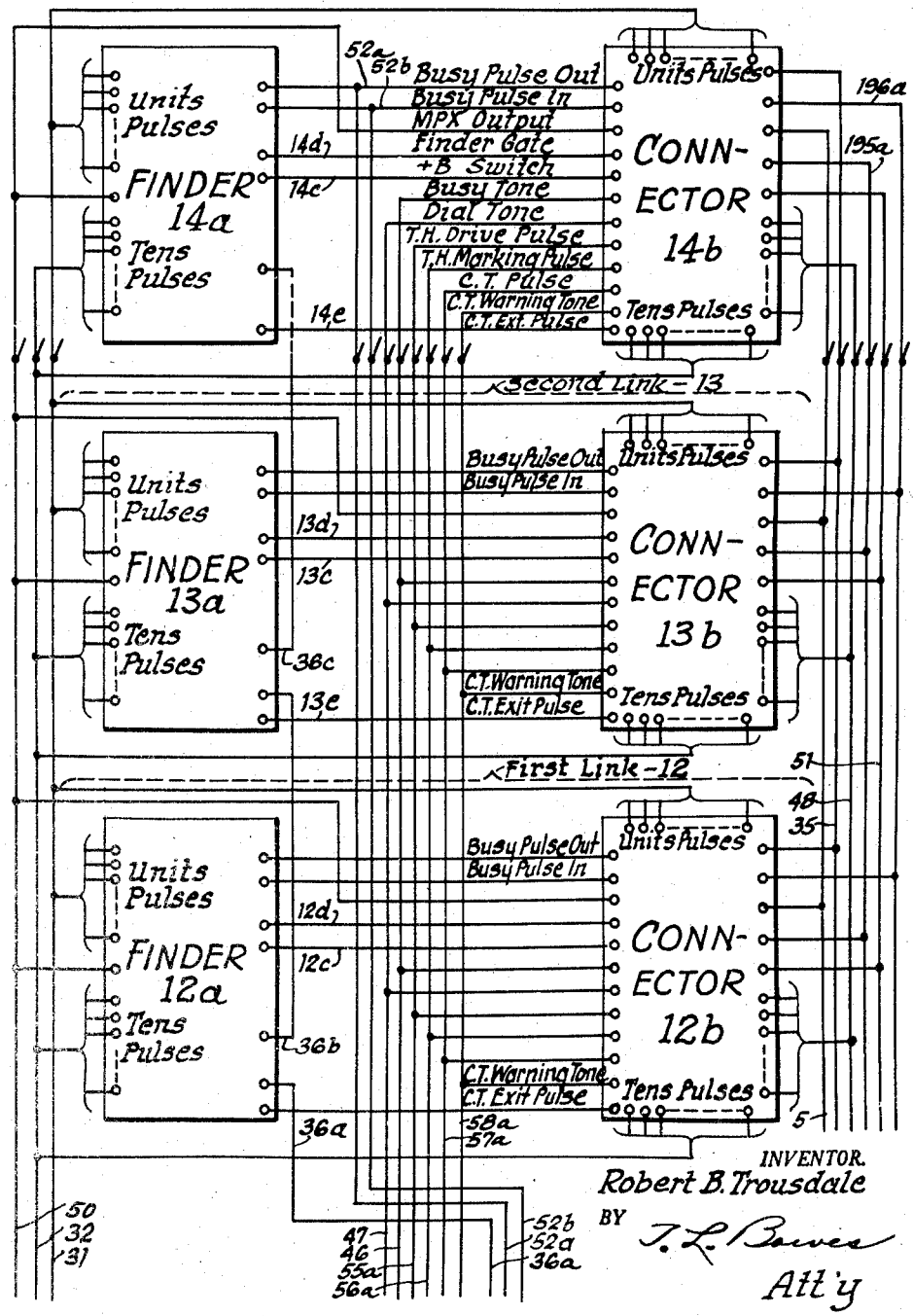
INVENTOR.
Robert B. Trousdale
BY
Att'y

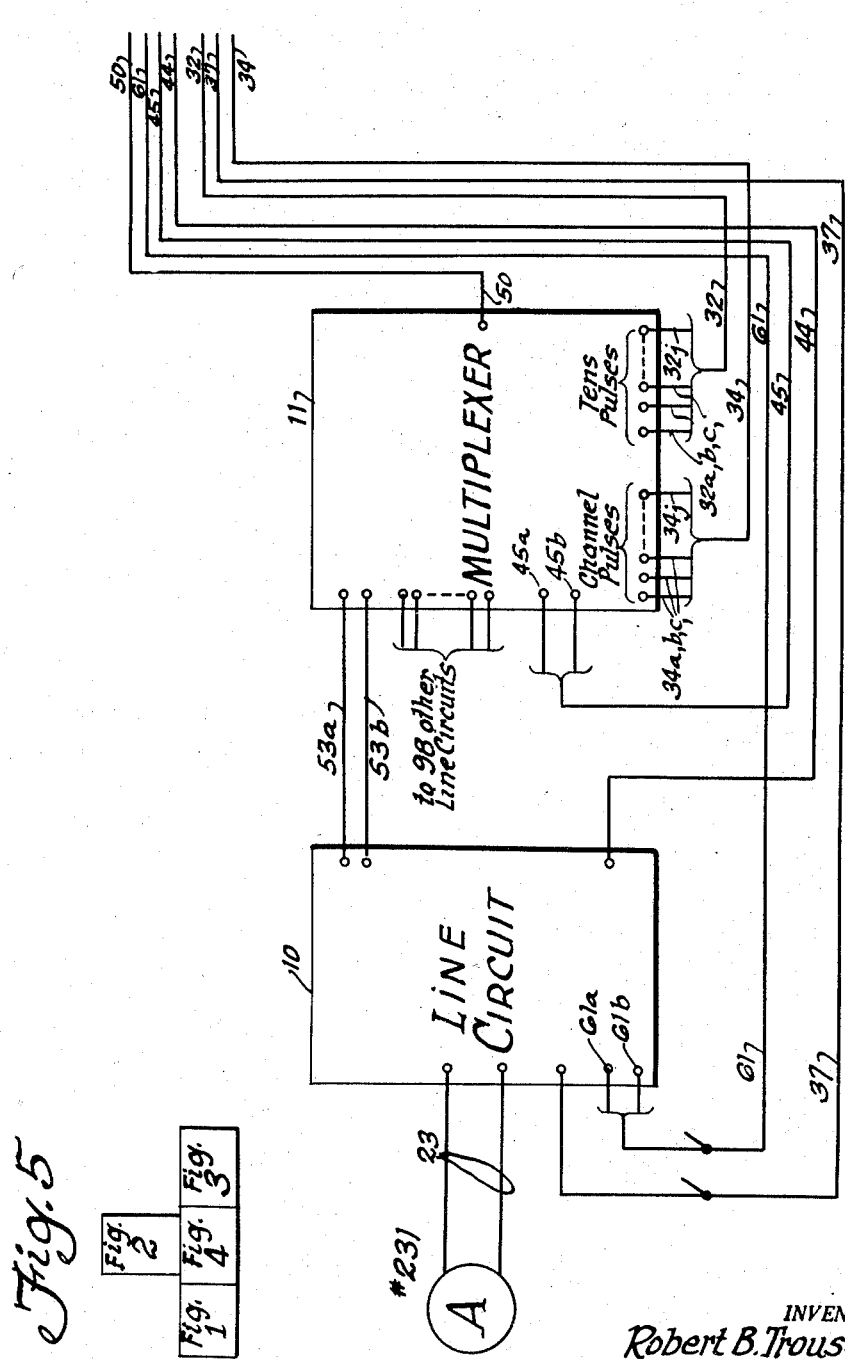

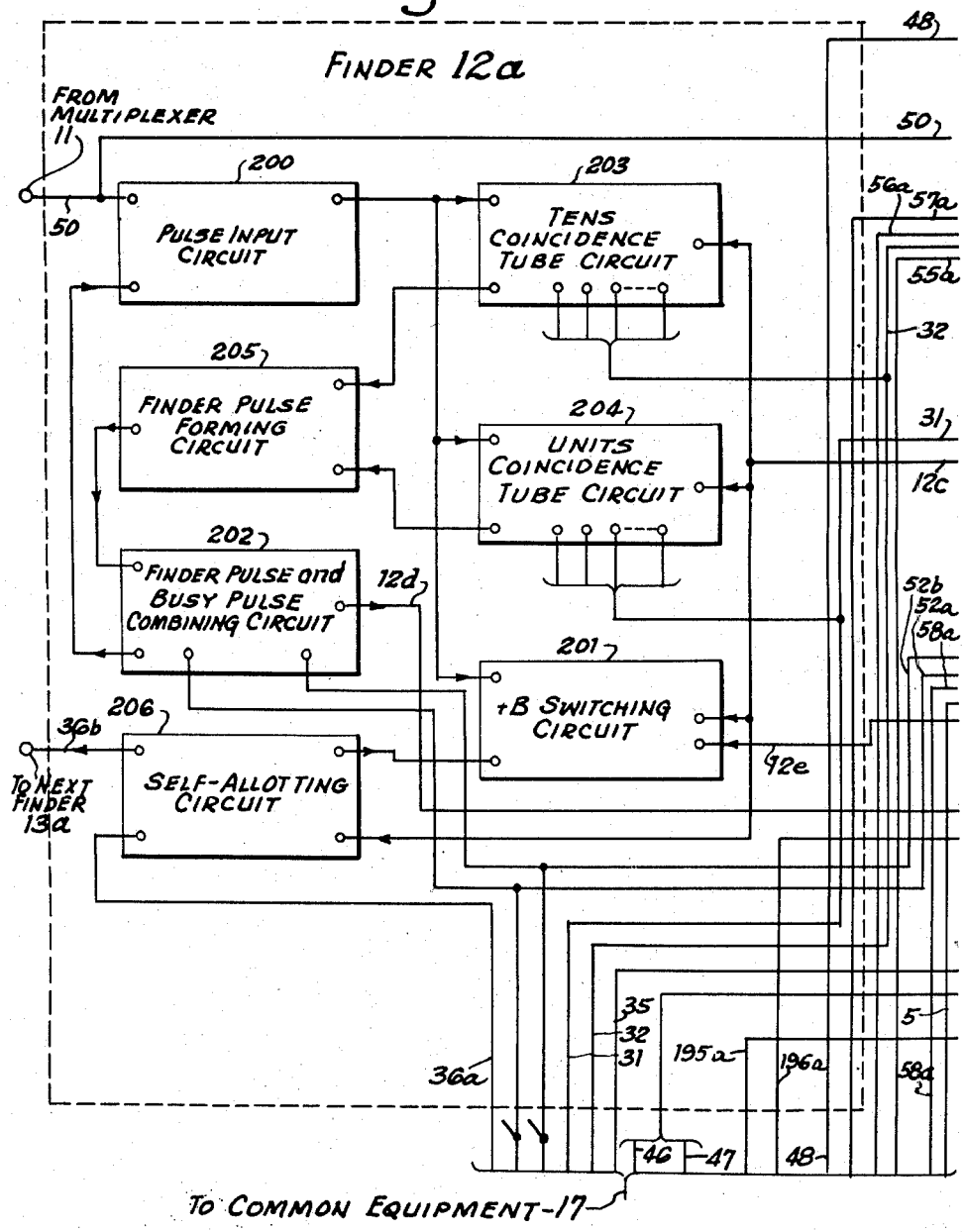

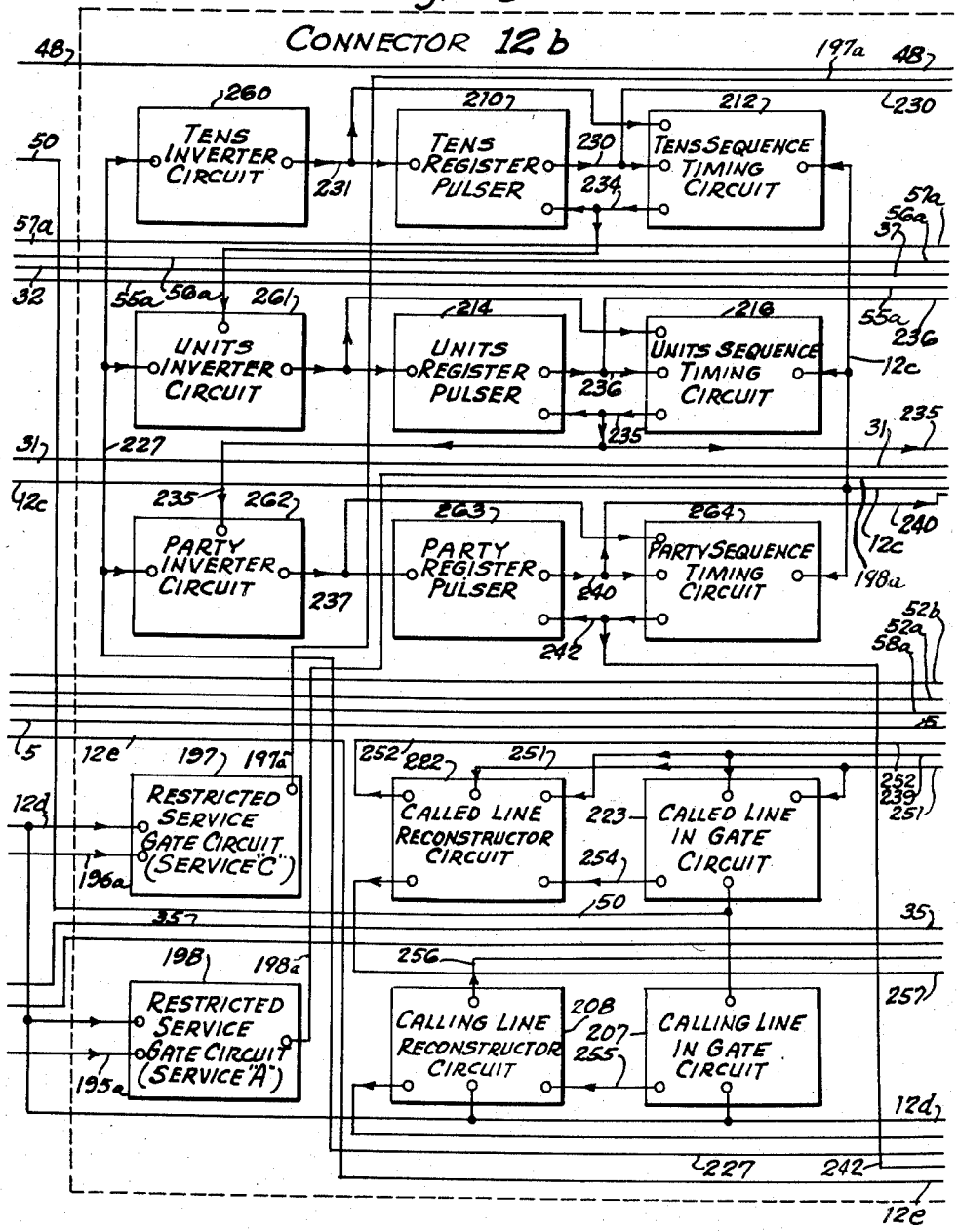

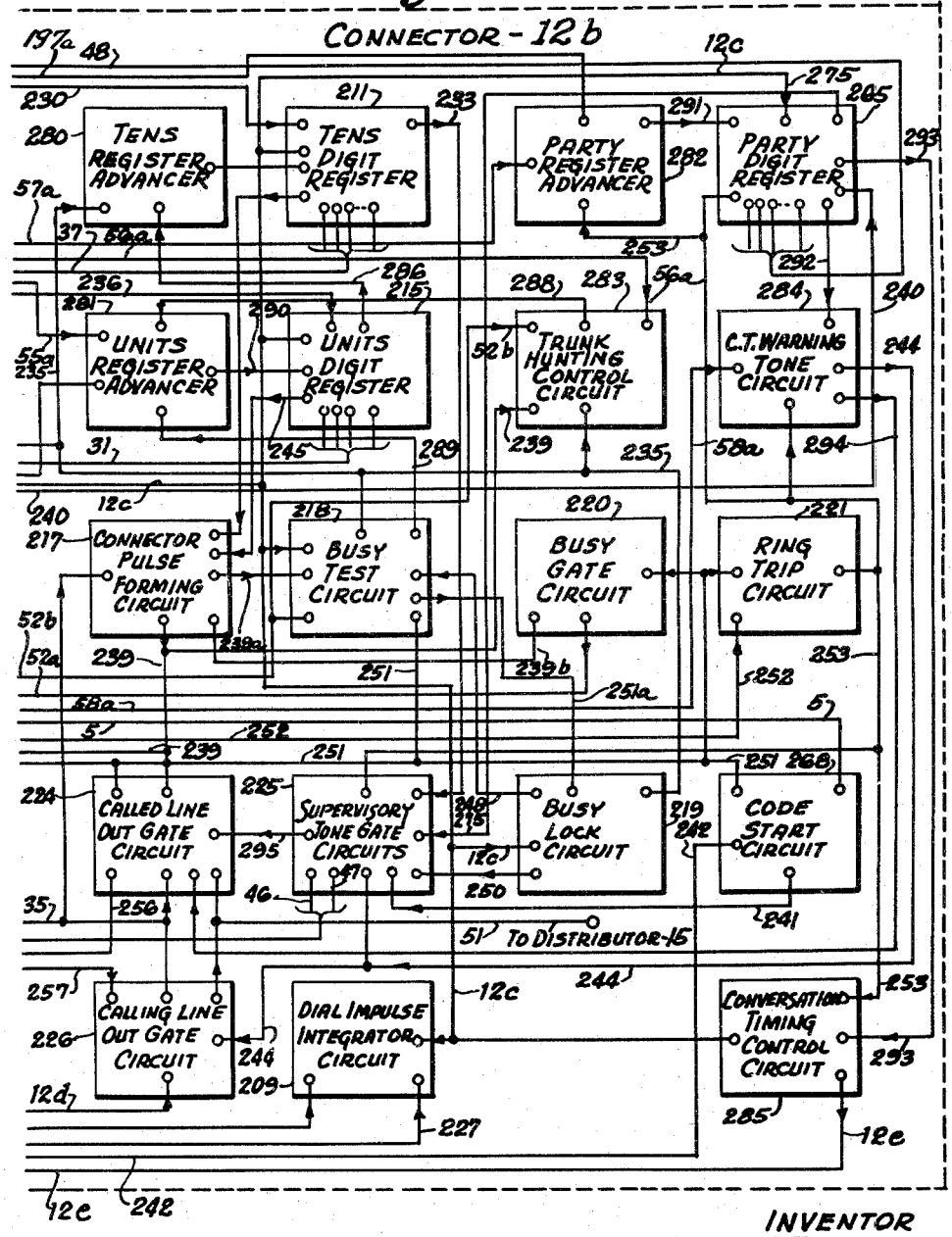

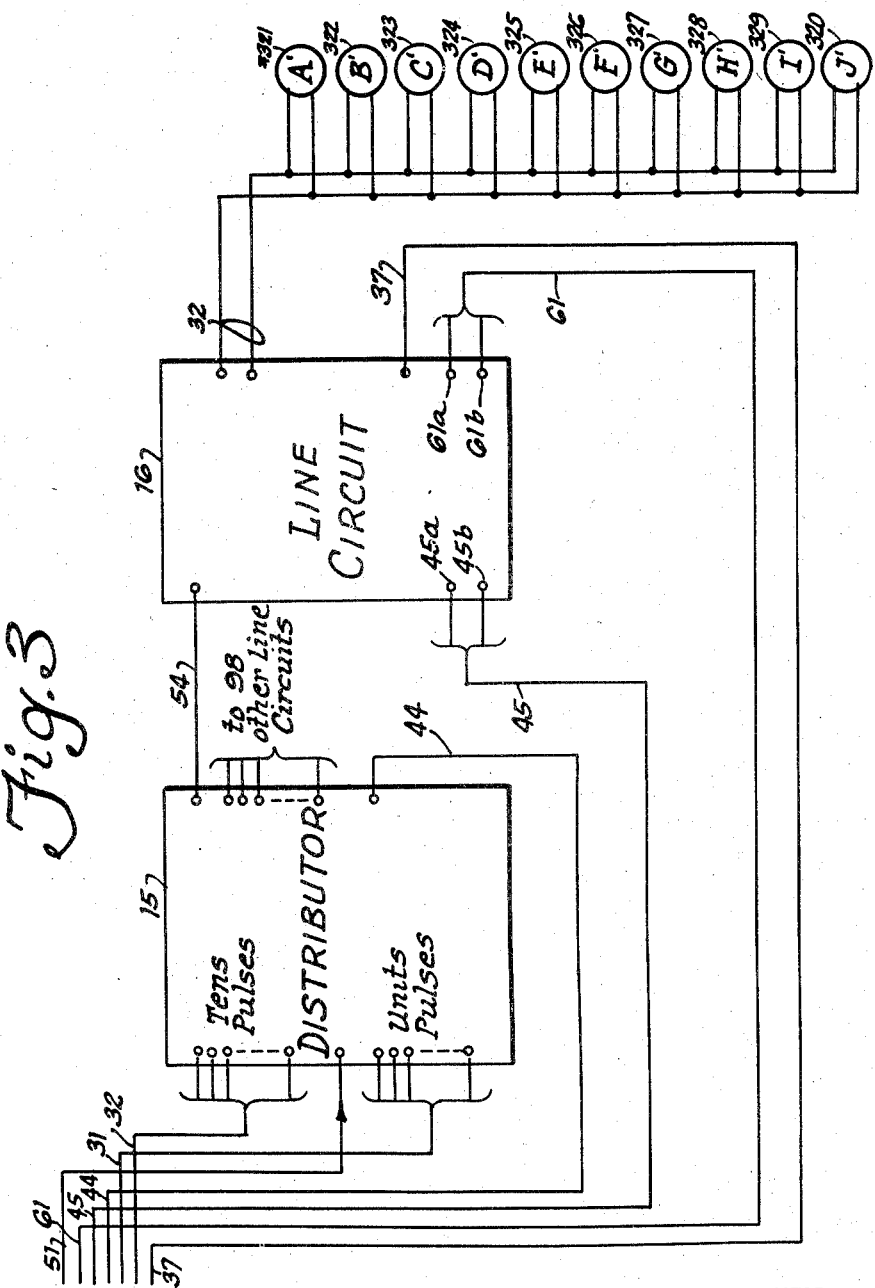

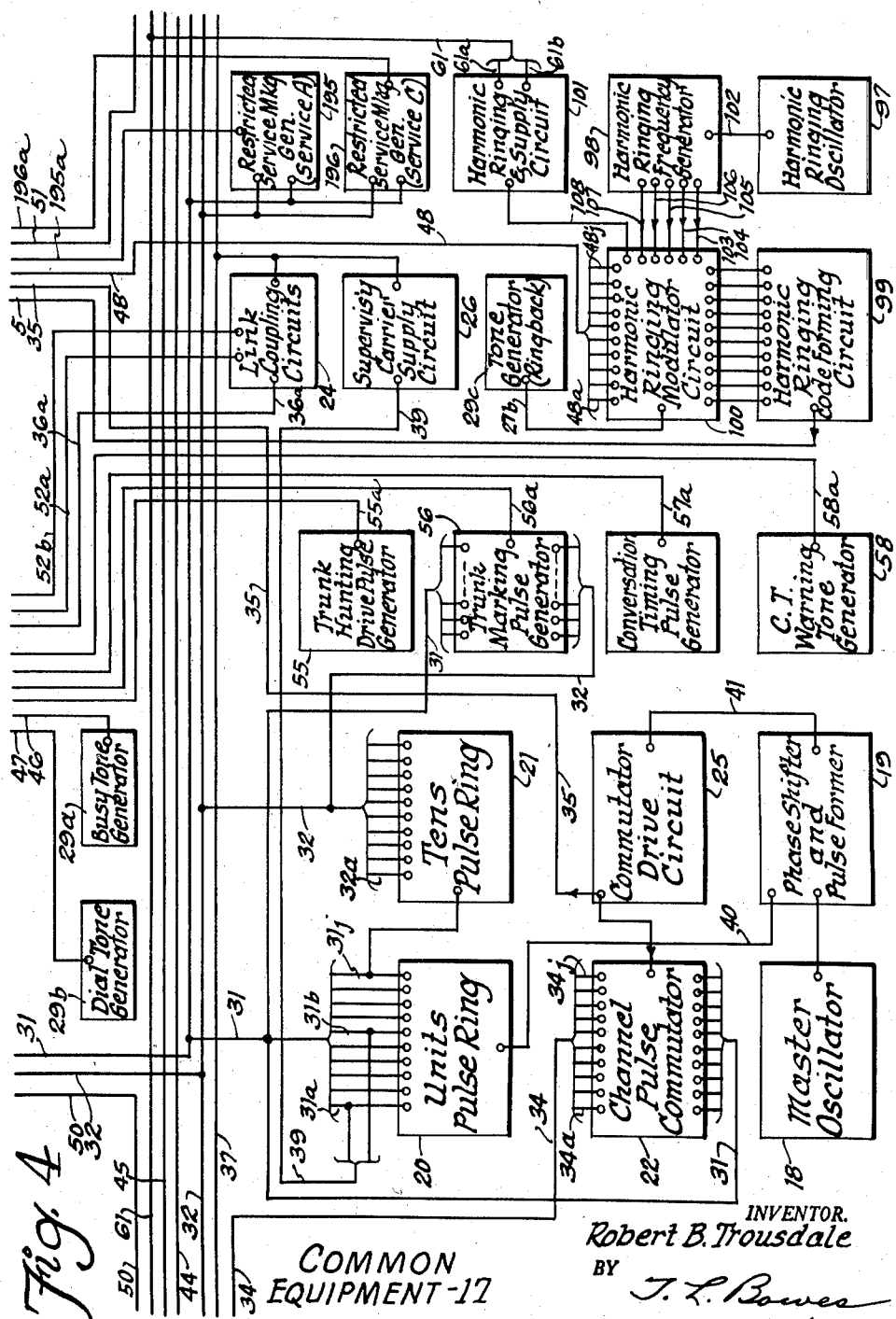

INVENTOR
ROBERT B. TROUSDALE

July 1, 1958  R. B. TROUSDALE  2,841,651
TELEPHONE SYSTEM
Filed Jan. 27, 1954  25 Sheets-Sheet 9

INVENTOR
ROBERT B. TROUSDALE
BY J. L. Bowes
ATTY

July 1, 1958  R. B. TROUSDALE  2,841,651
TELEPHONE SYSTEM
Filed Jan. 27, 1954  25 Sheets—Sheet 11
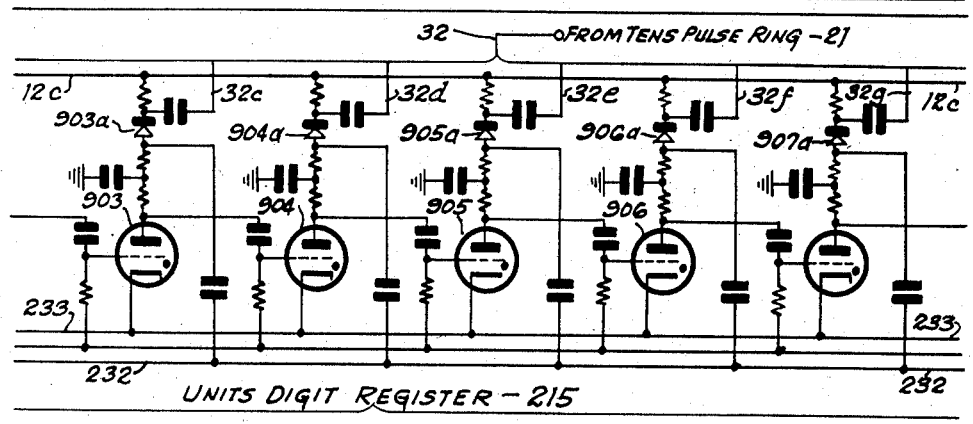
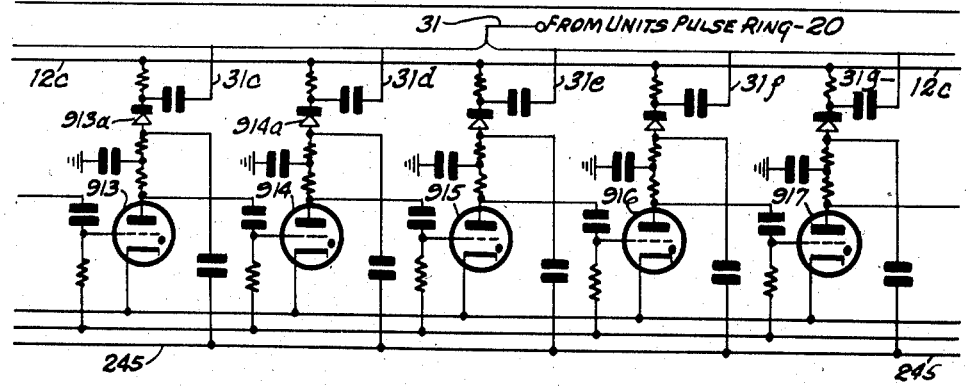
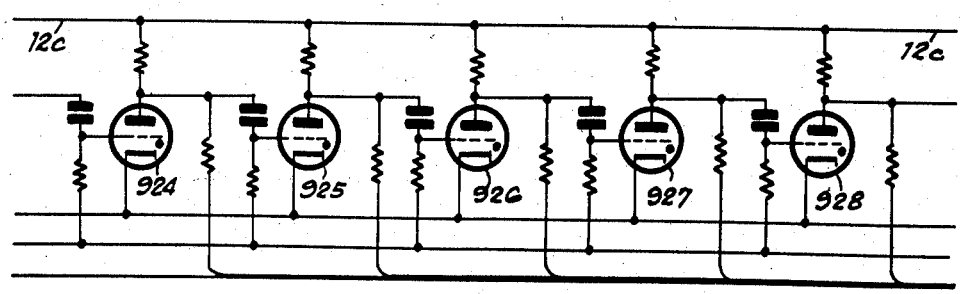
Fig. 9
INVENTOR
ROBERT B. TROUSDALE
BY  J. L. Bower
ATT'Y July 1, 1958

R. B. TROUSDALE 2,841,651

TELEPHONE SYSTEM

Filed Jan. 27, 1954

INVENTOR
ROBERT B. TROUSDALE
BY J. L. Bowes
ATTY

INVENTOR
ROBERT B. TROUSDALE
BY J. L. Bower
ATT'Y

July 1, 1958 — R. B. TROUSDALE — 2,841,651
TELEPHONE SYSTEM
Filed Jan. 27, 1954 — 25 Sheets-Sheet 16
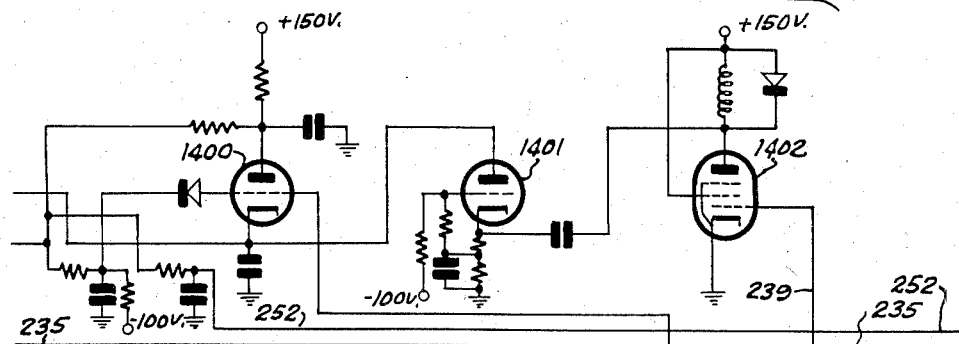
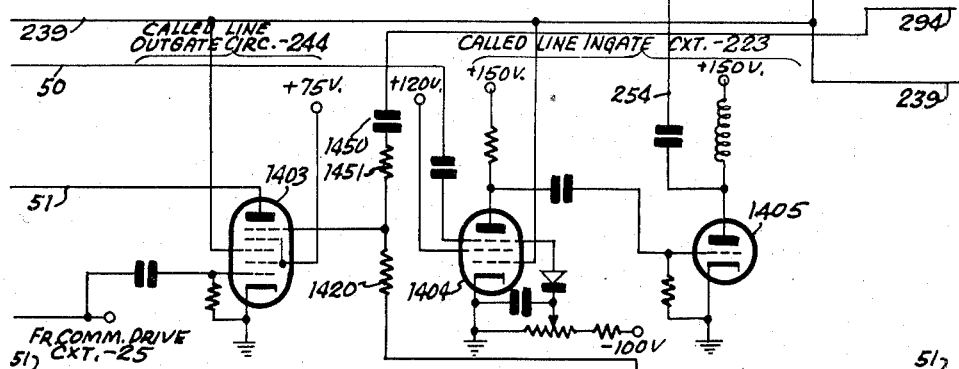
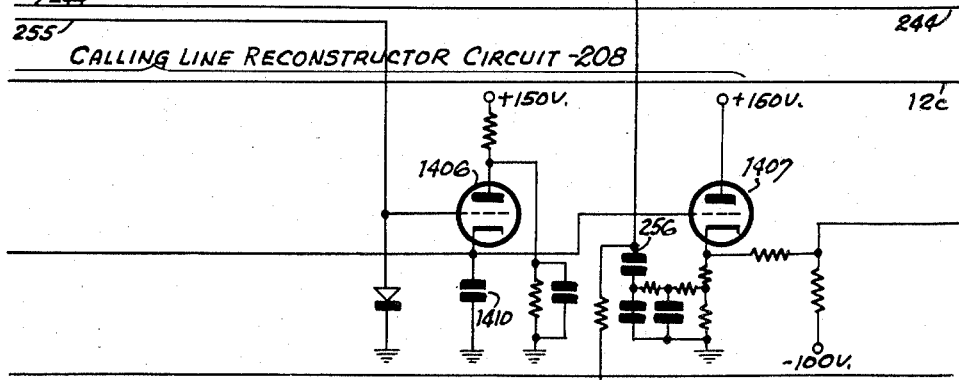
FIG. 14
INVENTOR
ROBERT B TROUSDALE
BY J. L. Bowes
ATT'Y July 1, 1958 — R. B. TROUSDALE — 2,841,651
TELEPHONE SYSTEM
Filed Jan. 27, 1954 — 25 Sheets-Sheet 17

INVENTOR
ROBERT B. TROUSDALE
BY J. L. Bowes
ATT'Y

July 1, 1958

R. B. TROUSDALE 2,841,651

TELEPHONE SYSTEM

Filed Jan. 27, 1954

INVENTOR
ROBERT B. TROUSDALE
BY J. L. Bowes
ATT'Y

| Fig. 6 | Fig. 7 | Fig. 8 | Fig. 9 | Fig. 10 |
|---|---|---|---|---|
| Fig. 13 | Fig. 14 | Fig. 15 | Fig. 16 | Fig. 17 |

INVENTOR.
Robert B. Trousdale
BY
J. L. Bowes
Attorney

July 1, 1958 R. B. TROUSDALE 2,841,651
TELEPHONE SYSTEM

Filed Jan. 27, 1954 25 Sheets-Sheet 23

INVENTOR.
Robert B. Trousdale
BY
J. L. Bowes
Attorney

July 1, 1958 R. B. TROUSDALE 2,841,651
TELEPHONE SYSTEM
Filed Jan. 27, 1954 25 Sheets-Sheet 24

INVENTOR.
Robert B. Trousdale
BY
T. L. Bowes
Attorney

INVENTOR.
Robert B. Trousdale

United States Patent Office 2,841,651
Patented July 1, 1958

2,841,651

TELEPHONE SYSTEM

Robert B. Trousdale, Webster, N. Y., assignor, by mesne assignments, to General Dynamics Corporation, a corporation of Delaware Application January 27, 1954, Serial No. 406,567

16 Claims. (Cl. 179—15)

The present invention relates to improved methods and apparatus for selectively setting up signal transmission connections between the lines of a signaling system, and, more particularly, to improved methods and apparatus for setting up two-way communication connections between the lines of an automatic telephone system wherein improved and simplified facilities are provided for restricting the service available to one or more calling lines of the system. Specifically, the present invention is directed to certain improvements in a fully automatic electronic telephone system of the type disclosed in a copending application of Frank A. Morris and Robert B. Trousdale, Serial No. 134,974, filed December 24, 1949, and my copending applications, Serial No. 301,215, filed July 28, 1952, and Serial No. 358,240, filed May 29, 1953, which issued on December 11, 1956, as U. S. Letters Patent No. 2,773,939, which are assigned to the same assignee as the present invention, whereby a simplified form of restricted service is provided in which a minimum amount of equipment is required to restrict the type of service available to certain designated calling lines of the system.

Many types of automatic switching apparatus have been proposed and developed for transmitting signals between the lines of telephone, telegraph and other communication systems. In the main, the apparatus proposed and developed for this purpose utilizes electromechanical devices embodying moving mechanical parts, such, for example, as relays, stepping switches and the like, to perform the line selecting, line interconnecting and ancillary functions required in selectively interconnecting any two lines on a large group of lines. While apparatus of this type and embodying switching devices of various forms have been developed to provide thoroughly reliable service, it is inherently subject to several limitations, including that of insufficient operating speed. To overcome these limitations, various proposals have been made for utilizing electronic facilities, such, for example, as cathode ray tubes for the purpose of transmitting signals between the lines of a signaling system on a selective basis. However, most, if not all, of these proposals are limited to arrangements for providing one-way signal transmission between two lines.

In the improved systems disclosed in the above-identified copending applications, a system of multiplexing, namely, pulse sampling effectively at an ultrasonic rate of the control and intelligence signals produced at each substation of the system, is utilized to provide signal channel separation. Specifically, each line of the system is assigned a particular pulse time position in each of repetitive pulse frames each comprising one hundred pulse time positions. Intelligence and control signals developed on any one line of the system are sampled only in the particular pulse time position assigned to the particular line and the samples are carried through the signal transmitting components of the system as far as the connector stage on multiplexer signal pulses occurring in this particular time position. In the connector stage, the control and intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In my copending application, Serial No. 301,215, identified above, there is disclosed facilities for providing special services such as trunk hunting and conversation timing. Also, in my copending application, Serial No. 358,240, identified above, there is disclosed facilities for restricting the service available to individual calling lines of the system. While this latter application, as well as the other above mentioned applications, is entirely suitable for its intended purpose, the restricted service system disclosed therein requires a plurality of finder-connector links for each type of service irrespective of the number of lines in each service group. It would be desirable to provide a system wherein the linkage employed to set up the call may be used to handle a call initiated on any line of the system, whether restricted or not, so that the number of finder-connector links in the system may be substantially reduced.

Accordingly, it is an object of the present invention to provide new and improved methods and apparatus for selectively setting up two-way communication connections between different pairs of lines of a signaling system wherein restricted service facilities are provided in which any one of the finder-connector links of the system may be employed to set up a call originating on any one of the lines of the system.

It is another object of the present invention to provide a new and improved electronic telephone system wherein the service available to calling lines of the system may be restricted and the finder-connector links of the system are arranged to provide a particular type of restricted service in accordance with the identity of the calling line.

It is still another object of the present invention to provide a new and improved electronic telephone system wherein restricted service facilities are provided while permitting any calling line of the system to use any idle one of the finder-connector links of the system in completing a call.

The invention, both as to its organization and method of operation, together with further objects and advantages thereof, will best be understood by reference to the following specification taken in connection with the accompanying drawings in which:

Figs. 1 to 4, inclusive, when arranged in the manner as shown in Fig. 5, illustrate in block diagram form an automatic telephone system characterized by the features of the present invention;

Figs. 2A, 2B and 2C, when laid side by side in the order named, diagrammatically illustrate the components of one of the finder-connector links of the system shown in Figs. 1 to 4, inclusive;

Figs. 6 to 10, inclusive, and 13 to 17, inclusive, when arranged in the manner shown in Fig. 24, illustrate the details of the connector portion of the finder-connector link shown in Figs. 2A, 2B and 2C;

Figure 6:
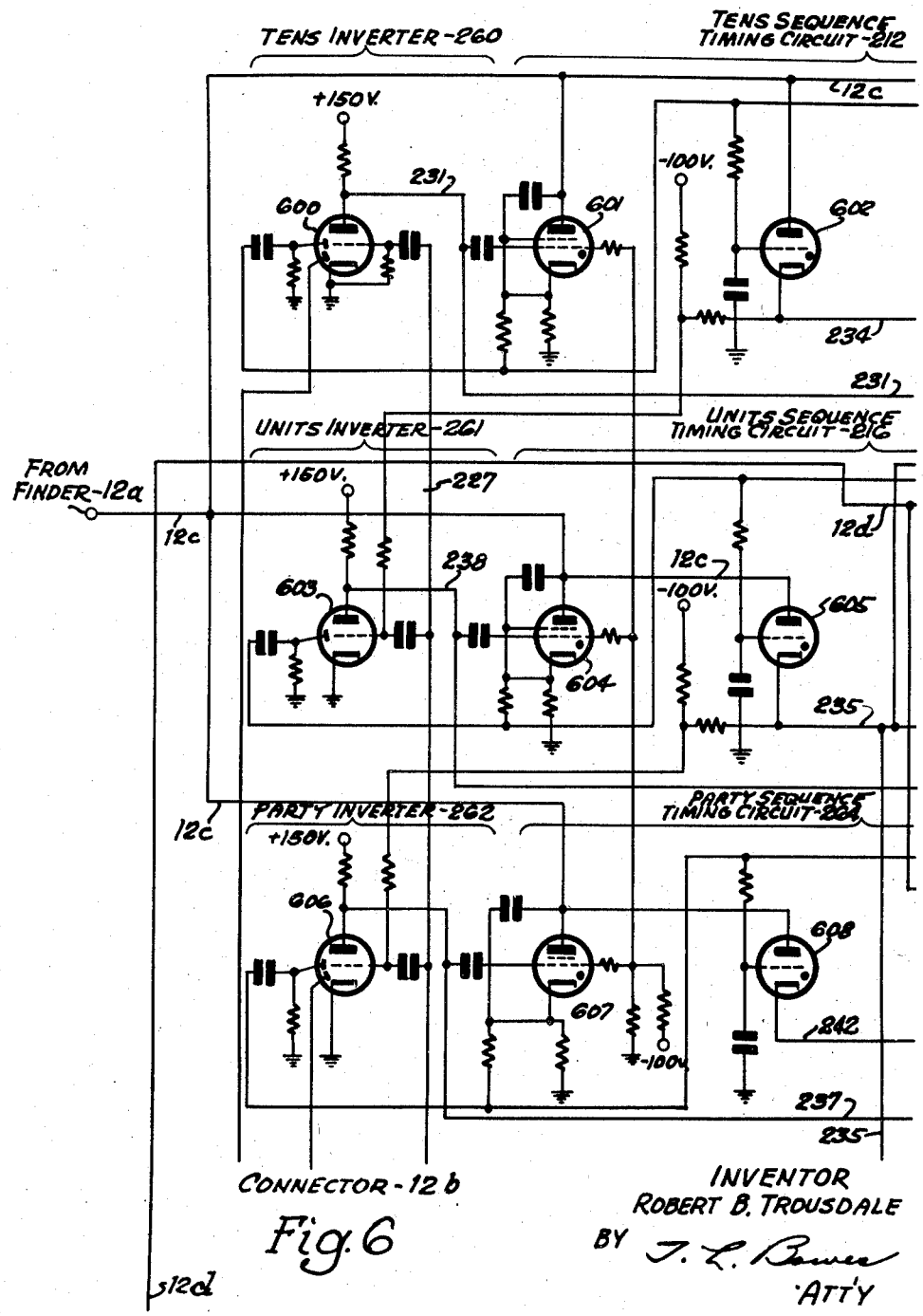

In general, the electronic telephone system herein disclosed is capable of serving 100 lines, each of which may have associated therewith a number of party line substations up to a maximum of 10 such party line substations for each line. More specifically, the disclosed system is capable of providing two-way communication connections between any two lines of the 100 line group on either a private or a party line basis and includes a simplified restricted service arrangement for marking the lines of the system as being in different service charge groups having different types of service available thereby and for restricting the service available to each calling line in accordance with the service group to which it is assigned. Furthermore, this is accomplished on a fully automatic basis without the use of any relays, stepping switches or other equivalent mechanical devices having moving parts.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

In order to provide restricted service facilities for different calling lines of the system, connectors of the system are adapted to provide different types of service and restricted service marking generators are employed to control each of the connectors of the system so that calling lines which are in a particular service group are given that particular type of service incident to the setting up of the connection. The restricted service marking generators are controlled in accordance with the tens and units pulses developed in the common equipment of the system whereby marking pulses occurring in the particular time positions assigned to the lines in a particular service group are developed.

GENERAL DESCRIPTION OF THE SYSTEM

Referring now to the drawings and more particularly to Figs. 1-4, inclusive, thereof, the present fully automatic electronic telephone system is there illustrated as comprising line circuits, such as the illustrated line circuits 10 and 16 which are individual to the 100 lines of the system, multiplexer 11, of which only one is required in the system, a group of identical finder-connector links 12, 13 and 14 which are adapted to provide different types of service in accordance with the service group classification of the calling line, a distributor 15, of which only one is required in the system, and the common equipment indicated generally at 17 in Fig. 4 of the drawings.

The 100 lines of the system are arranged in different restricted service groups, each group of lines having a particular type of service available thereto on calls originating thereon. Thus, in the illustrated embodiment, the lines numbered 10 to 25, inclusive, and 56 to 59, inclusive, are arranged in a first restricted service group designated as the service A group, and these lines are adapted to receive a service wherein trunk hunting or consecutive number hunting facilities are made available to the calling line and wherein the length of the call is unlimited, i. e., no conversation timing facilities are employed. In the illustrated embodiment, the lines numbered 1 to 9, inclusive, 26 to 29, inclusive, and 60 to 100, inclusive, are arranged in a second restricted service group, identified as the service B group, the lines in the service B group being adapted to receive a service wherein the trunk hunting or consecutive number hunting facilities are not available to the calling line but the duration of the call is unlimited as in the service A group. In the illustrated embodiment, the remaining lines of the system, i. e., the lines numbered 30 to 55, inclusive, are arranged in a third service group, identified as the service C group, the lines in the service C group being arranged to receive a service wherein no trunk hunting or consecutive number hunting facilities are available and the duration of the call is limited by conversation timing facilities. The conversation timing facilities function to time the duration of the call, to warn the calling and called subscribers when the conversation timing period is almost over, and to break the connection when the conversation timing period has expired. In this connection, it will be understood that the lines of the system may be picked at random or arranged in any desired sequence within the different service groups, a consecutively numbered group arrangement being illustrated merely to simplify the description of the system. It will also be understood that other suitable service restrictions may be placed on the calling lines of the system in accordance with the general principles of the present invention.

Each of the finder-connector links of the system is comprised of a finder and a connector. Thus, the first link 12 includes a finder 12a and a connector 12b, the second link 13 includes a finder 13a and a connector 13b and the last link includes a finder 14a and a connector 14b. It will be understood that the number of finder-connector links employed is chosen as required to handle the traffic requirements of the system. Thus, although only three links have been illustrated, it may be necessary to employ more links to handle the expected traffic, inclusion of the additional links being accomplished by connecting appropriate terminals of the additional links to the indicated multiple points.

The line circuits respectively terminate different two-conductor lines which may be used for either private or party line service. Thus, in the illustrated embodiment, the line circuit 10 terminates the private line 23 and the line circuit 16 terminates the party line 32. The private lines of the system have one substation associated therewith, this substation having a directory number designation corresponding to the line number plus the party line ringing digit for uniform directory numbering. Thus, line 23 terminates in substation A having the directory No. 231 assigned thereto and the line 32 terminates in a plurality of party line substations A', B', C', etc. which are assigned directory Nos. 321, 322, 323, etc. It will be understood that any one or all of the lines of the system may have a number of party line substations associated therewith, these substations being selectively signaled on a fully selective or semi-selective harmonic ringing basis as described in detail in my copending application Serial No. 301,215, identified above.

Each line circuit performs the functions of repeating intelligence or control signals from its associated substation or substations to a corresponding one of the gate circuits in the multiplexer 11, repeating intelligence signals derived from a particular gate circuit of the distributor 15 to its associated substation or substations, and of responding to party line ringing control signals, derived from the operatively associated connector by way of the distributor 15, by transmitting ringing current at a particular selected frequency to the associated substation or substations on a call incoming thereto. To perform these functions, the line circuit 10, for example, is connected by way of the conductors 53a and 53b to one of the gate circuits in the multiplexer 11 and is connected by way of the conductor 44 to the corresponding gate circuit provided in the distributor 15. Each line circuit is also connected to certain components of the common equipment 17 in a manner more fully explained below.

Generally speaking, the multiplexer 11 performs the functions of sampling the intelligence and control signals derived from the one hundred line circuits of the system only in the pulse time positions of each pulse frame individually assigned to the lines served by these line circuits and of modulating the sampled intelligence or control signals on the multiplexer signal pulses occurring in these pulse time positions for transmission to all of the finders and connectors of the system over the common conductor 50. In reverse manner, the distributor 15 performs the function of deriving intelligence signals from the signal modulated connector signal pulses which are released by the connectors of the system to the common input conductor 51 of the distributor 15 and of distributing the derived signals to the corresponding line circuits in accordance with the pulse time position assigned to the particular connector signal pulses. In performing the described functions, the multiplexer 11 and the distributor 15 are controlled by certain components of the common equipment 17.

The finders of the various links of the system are identical and function strictly as control units. Thus, considering the finger 12a for example, this finder performs the function of determining when the link 12 shall be taken into use in handling a call, determining which calling line the link 12 is to be associated with in handling a call, and determining the pulse time position of successive pulse frames which is assigned to the calling line and during which signal bearing pulses derived from the multiplexer 11 shall be effective to produce a response in the finder 12a and in the associated connector 12b. To advise the connector 12b of the pulse time position assigned to the calling line and to control the restricted service facilities in this connector, the finder 12a transmits finder gate pulses to the connector 12b in this pulse timing position over the conductor 12d. The finder 12a also performs the function of conditioning its associated connector 12b for operation when the link 12 is definitely associated with a calling line so as to handle the call initiated on that line. This is accomplished through operation of the finder 12a to impress operating anode potential upon a plurality of tubes in connector 12b over +B switch conductor 12c. When operatively associated with a particular calling line, the finder 12a also performs the function of guarding the calling line against intrusion on an incoming call to the line. This is accomplished through operation of the finder 12a to feed busy pulses occurring in the particular pulse time position assigned to the calling line with which the finder is operatively associated over the common busy pulse out conductor 42a and by way of the link coupling circuits 24 and the busy pulse in conductor 52b, to each of the finders and connectors of the system. The finder 12a further performs the function of supplying an allotting signal over the conductor 36b to the finder 13a of next succeeding link 13 when the finder 12a is taken into use so that the finder-connector links of the system are allotted to the use of calling lines, one at a time.

To perform the above functions in a manner more fully explained below, the finder 12a comprises (see Fig. 2A) a pulse input circuit 200, a +B switching circuit 201 and pulse combining circuit 202, tens and units coincidence tube circuits 203 and 204, a finder pulse forming circuit 205 and a self-allotting circuit 206.

Each of the connectors of the system is controlled by the finder gate pulses delivered thereto from the associated finder and responds to signal bearing multiplexer pulses occurring in the pulse time position corresponding to the calling line with which the link is associated. The connector also responds to the application of operating anode potential to the +B switch conductor and to the finder gate pulses by returning a dial tone signal to the calling subscriber. The connector then responds to dial the impulses constituting the first and second digits dialed into the connector by selecting the particular pulse time position assigned to the called line and the third or party line ringing digit is employed to select the particular party line ringing signal assigned to the called substation associated with the called line. In so doing the connector tests the pulse time position assigned to the called line to determine the idle or busy condition thereof and transmits a busy tone signal to the calling subscriber if the called line tests busy.

When the called line time position is selected in the connector, it conditions itself to accept signal bearing pulses from the multiplexer 11 which occur in the pulse time position assigned to the selected called line and stores the intelligence carried by these pulses which is transmitted to the distibutor 15 on the connector signal pulses occurring in the time position corresponding to the calling line with which the link is operatively associated. The connector also performs the auxiliary functions of terminating dial tone transmission when the first dial impulse is dialed into the connector and busying the called line over the common busy pulse out conductor 52a to guard the called line against seizure through another link. When the call is answered, the connector terminates the party line ringing signal and concurrently terminates a ringback tone signal which is transmitted to the calling subscriber to inform him of the progress of the call.

In addition to the above mentioned functions, each of the connectors of the system is provided with restricted service facilities which are controlled by the restricted service marking pulses developed by the restricted service marking generators 195 and 196 in the common equipment 17 so as to set up a particular type of service in accordance with the restricted service group classification of the calling line with which the connector is operatively associated. Thus, each connector is provided with a first restricting service gate circuit which is operated when one of the lines in the Service A group is operatively associated with the connector as a calling line so that trunk hunting or consecutive number hunting facilities are rendered operative, thereby to permit the selection of an idle line within a called private branch exchange trunk group in response to a call directed to this trunk group. Thus, if the called line tests busy and is a member of a private branch exchange trunk group, the connector functions to select the pulse time position next adjacent the time position assigned to the called line, i. e. the time position assigned to the next consecutively numbered line of the system and tests successive pulse time positions until either an idle line is found or the last line in the called trunk group is reached. If all of the lines in the trunk group are busy, the connector then transmits a busy tone signal to the calling subsecriber to inform him of this condition. Each connector is also provided with a second restricted service gate circuit which is operated when the calling line is a member of the service C group and functions to enable the conversation timing facilities in the connector to limit the duration of the call.

To perform the above functions in the manner more fully explained below, the connector 12b comprises (see Figs. 2B and 2C) a calling line in gate circuit 207, a calling line reconstructor circuit 208, a called line out gate circuit 224, a called line in gate circuit 223, a called line reconstructor circuit 222 and a calling line out gate circuit 226. The three circuits 207, 208 and 224 function to repeat intelligence from the calling line to the called line, whereas, the three corresponding circuits 223, 222 and 226 function to repeat to the calling line intelligence derived from the called line. In addition, each connector of the system comprises a dial impulse integrator circuit 209, tens units and party inverter circuits 260, 261 and 262, tens units and party digit registers 211, 215 and 265, tens units and party register pulses 210, 214 and 263, and tens units and party sequence timing circuits 212, 216 and 264. These component units function to register the time position assigned to the calling line as well as the party line ringing signal assigned to the called substation. Each connector further comprises a connector pulse forming circuit 217, a busy test circuit 218, a busy lock circuit 219, a busy gate circuit 220, supervisory tone gate circuits 225, a code start circuit 268 and a ring trip circuit 221.

In order to perform the restricted service functions described generally above, the connector 12b further comprises the restricted service gate circuit 198 which is controlled by the restricted service marking generator 195 and controls the trunk hunting facilities in connector 12b. These trunk hunting facilities include a trunk hunting control circuit 283, a units register advancer 281 and a tens register advancer 280. The connector 12b also comprises a second restricted service gate circuit 197 which is controlled by the restricted service marking generator 196 and controls the conversation timing facilities in the connector 12b. These conversation timing facilities include a conversation timing warning tone circuit 284, a party register advancer 282 and a conversation timing control circuit 285. In this connection, it will be understood that no restricted service gate circuit is required for the lines in the service B group since these lines do not require either the trunk hunting facilities or conversation timing facilities and both the trunk hunting facilities and the conversation timing facilities are normally inoperative unless enabled by one of the restricted service gate circuits 197 or 198.

The common equipment 17 comprises a master oscillator 18, a phase shifter and pulse former network 19, a units pulse ring circuit 20, a tens pulse ring circuit 21, a channel pulse commutator 22, a commutator drive circuit 25, a harmonic ringing oscillator 97, a harmonic ringing frequency generator 98, a harmonic ringing code forming circuit 99, a harmonic ringing modulator circuit 100, a ringback tone generator 29c, a supervisory carrier supply circuit 26, the link coupling circuits 24, a busy tone generator 29a, a dial tone generator 29b, the trunk hunting drive pulse generator 55, the trunk marking pulse generator 56, the conversation timing pulse generator 57, and the conversation timing warning tone generator 58.

All of the above-enumerated units are substantially identical to the corresponding units identified by the same reference numerals in my copending application, Serial No. 301,215, identified above, and reference may be had to this application for a complete and detailed description thereof.

The common equipment 17 of the present invention also includes a restricted service marking generator 196 which functions in a manner to be explained in more detail hereinafter to develop positive restricted service marking pulses on the output conductor 196a thereof in the time positions assigned to the lines in the service C group. Thus, in the illustrated embodiment, the generator 196 develops marking pulses on conductor 196a in the time positions assigned to the lines numbered 30 to 55, inclusive, which comprise the service C group. The common equipment 17 also includes the restricted service marking generator 195 which is arranged to provide positive restricted service marking pulses on the output conductor 195a thereof in the time positions assigned to the lines numbered 10 to 25, inclusive, and 56 to 59, inclusive, which comprise the service A group.

In order to render the mode of operation of the system more readily understandable, a pulse chart has been illustrated in Figs. 20 to 23, inclusive, to show the relative widths of the pulses developed by the common equipment components 19, 20, 21 and 22 during two successive pulse frames, as well as the time or phase relationship between these pulses. As there shown, the units pulse ring drive pulses 95a, appearing on the conductor 40, are produced by the phase shifter and pulse former circuit 19 along the zero potential reference line 95 at a frequency rate of one megacycle and are of positive polarity. Similarly, the channel pulse commutator drive pulses 96a appearing on the conductors 41 and 35 are produced by the phase shifter and pulse former network 19 along the zero potential reference line 96 at the same frequency of one megacycle and are of positive polarity. It will be noted that both the units pulse ring drive pulses 95a and the commutator drive pulses 96a are very narrow, i. e., persist for very short time intervals, and that the pulses 96a are so displaced in time relative to the pulses 95a that each commutator drive pulse 96a occurs approximately at the middle of the period separating the preceding and succeeding units pulse ring drive pulses 95a. The positive units pulses appearing respectively on the units pulse conductors 31a, 31b—31j are produced along the zero potential reference lines 62, 63—71. It will be noted that the units pulses are produced by the units pulse ring circuit 20 at the fundamental frequency rate of one megacycle. However, due to diversion of the pulses successively to different ones of the units pulse conductors a, b—j, the pulses along any particular zero potential reference line, such, for example, as the line 62, recur only at a frequency rate of one hundred kilocycles.

The positive tens pulses successively produced by the tens pulse ring circuit 21 on the tens pulse conductors 32a, 32b—32j are illustrated as appearing along the ten zero potential reference lines 72 to 81, inclusive. It will be noted that each tens pulse persists for a time interval exactly equaling the time required to produce ten units pulses. Thus, the tens pulse period 72a persists for the duration of the interval in which the ten units pulses 62a–71a are successively produced by the units pulse ring circuit 20.

The channel pulses which are successively produced on the ten channel pulse conductors 34a, 34b–34j by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96a appearing along the zero potential reference line 96. Like the units pulses, the channel pulses are produced at the fundamental frequency rate of one megacycle, but due to the action of the commutator 22 in diverting these pulses successively to the conductors 34a, 34b–34j recur only on each of these conductors at a rate of one hundred kilocycles. Thus the channel pulses 82a, 82b, 82c, etc., appearing along the reference line 82 and impressed on the conductor 34a are spaced apart timewise by like intervals each of which exactly equals the sum of ten units pulse time periods. During this spacing interval, nine additional channel pulses are successively produced along the reference lines 83, 84–91 to appear on the conductors 34b, 34c–34j.

With the above general description of the pulse chart illustrated in Figs. 20 to 23, inclusive, in mind, it will readily be understood that each pulse frame is divided into one hundred readily identifiable pulse time positions. Thus, the first ten pulse time positions of each pulse frame, which are respectively assigned to the lines of the system having the directory number designations "11," "12," "13"—"10", are defined by the first tens pulse period 72a of the frame within which the ten units pulse periods 62a, 63a, 64a–71a occur. Similarly, the second ten pulse time positions, which are respectively assigned to the lines of the system having the directory number designations "21," "22," "23"–"20," are defined by the second tens pulse period 73a during which the ten units pulse periods 62b, 63b, 64b–71b ocur. Again, the third ten pulse time positions, which are respectively assigned to the lines of the system having the directory number designations "31," "32," "33"—"30," are marked out by the third tens pulse time period 74a during which the ten units pulse periods 62c, 63c, 64c–71c occur. Thus, it will be understood that the pulse time position of each pulse frame which is assigned to the illustrated line 23 occurs during the second tens pulse interval 73a of each pulse frame and is coincident with the units pulse period 64b of each pulse frame. It will also be apparent that the corresponding channel pulse 84b occurs well within the limits of this pulse time position. Similarly, the pulse time position assigned to the illustrated line 32 occurs during the third tens pulse time interval 74a of each pulse frame and is coincident with the second units pulse period 63c of each pulse frame. Here again, each channel pulse 83c corresponding to the line 32 occurs well within the limits of the particular pulse time position assigned to the line 32 in each pulse frame.

Figure 11:
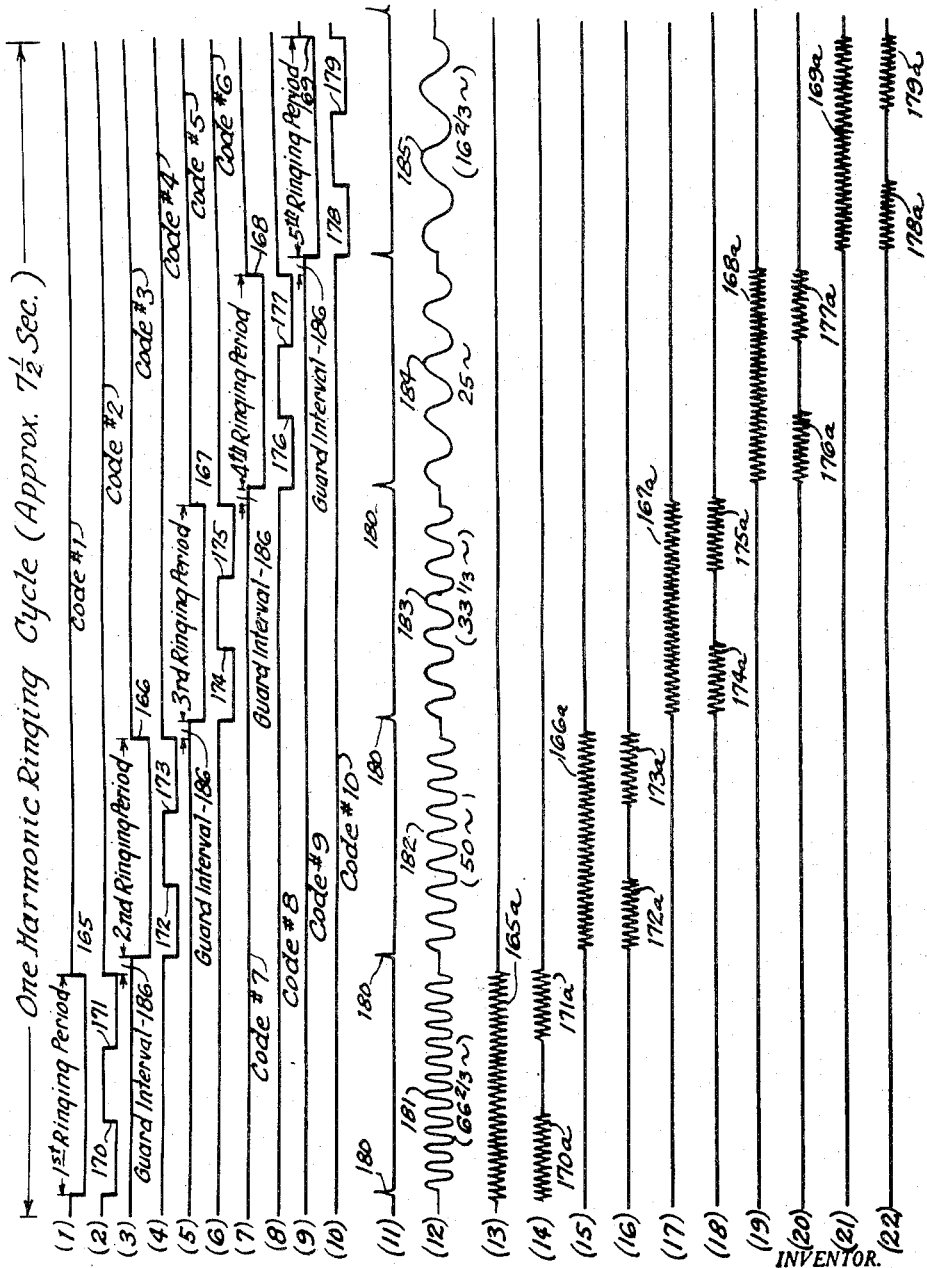
Figs. 11 and 12 illustrate certain waveforms developed in the system of Figs. 1 to 4, inclusive.

In order further to render the mode of operation of the fully selective or semi-selective harmonic ringing system of the present invention more readily understandable, a harmonic code sequence chart has been illustrated in Fig. 11 to show the time and phase relationship of the signals developed by the harmonic ringing code forming circuit 99 and the harmonic ringing modulator circuit 100 in the common equipment 17 during one harmonic ringing cycle. As there shown, the code forming circuit 99 develops a series of long ringing pulses 165, 166, 167, 168 and 169 on five different output code buses thereof which recur in succession during successive harmonic ringing cycles of approximately seven and one-half seconds duration. The long ringing pulses 165 to 169, inclusive, define a succession of five ringing periods which are separated by guard intervals 186 of relatively short duration. The code forming circuit 99 also operates to produce on five other code buses thereof a pair of short ringing pulses during each ringing period. Thus the circuit 99 develops the short ringing pulses 170 and 171 during the first ringing period, the pulses 172 and 173 during the second ringing period, the pulses 174 and 175 during the third ringing period, etc. In addition, the code forming circuit 99 develops the positive code start pulses 180 (Fig. 11(11)) which occur substantially at the end of each of the guard intervals 186. The code start pulses 180 are transmitted over the common conductor 5 to each of the connectors 12b, 13b and 14b to delay the selection of a particular party line ringing signal until the end of a particular ringing period.

The long ringing pulses 165 are employed in the harmonic ringing modulator circuit 100 successively to gate different ringing frequencies to the common output conductor 108 and the composite or multiplexed ringing frequency signal is filtered in the harmonic ringing amplifier and supply circuit 101 so as to provide a ringing voltage waveform substantially as shown in Fig. 11(12). Thus, during the first ringing period the ringing pulse 165 is used to gate a 66⅔ C. P. S. ringing voltage to the common conductor 108. After the guard interval 186, the ringing pulse 166 is employed to gate a 50 C. P. S. ringing voltage to the conductor 108 during the second ringing period. Likewise, the successive ringing pulses 167, 168 and 169 are employed successively to gate to the common output conductor 108 ringing voltages having frequencies of 33⅓ C. P. S., 25 C. P. S. and 16⅔ C. P. S.

In order to produce ringing control signals which may be used to control the application of ringing current to the called line during the particular ringing period and in accordance with the particular ringing code assigned to the called substation connected thereto, and also to produce concurrently therewith corresponding ringback tone signals which may be used to advise the calling line subscriber that the called line is being rung in a particular code sequence, the long and short ringing pulses (Figs. 11(1)–(10), inclusive) developed by the harmonic ringing code forming circuit 99 are used individually to gate to the output conductors 48a–48j, inclusive, a ringback tone signal for the duration of the ringing pulse. Thus, the ringing pulse 165 developed in the code forming circuit 99 is used to develop a ring back tone signal 165a which persists for the duration of the first ringing period. Likewise, the short ringing pulses 170 and 171 are employed to produce the ringback tone signals 170a and 171a which have a duration of one-half second and are separated by a one-half second interval, the signals 170a and 171a also ocurring during the first ringing period. In the same manner the pulses 166, 172 and 173 are employed to develop the corresponding ringback tone signals shown in Figs. 11(15) and (16) during the second ringing period. In a similar manner the long and short ringing pulses which are produced during the third, fourth and fifth ringing periods are employed to produce the ringback tone signals shown in Figs. 11(17)–(22), inclusive.

With the above general description of the harmonic code sequence chart illustrated in Fig. 11 in mind, it will readily be understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately seven and one-half second intervals. In the event that a maximum of five substations are associated with any one line of the system, only the long ringing pulses 165 to 169, inclusive, need be employed, and under these conditions the first substation would be provided with ringing facilities which are responsive to a 66⅔ C. P. S. ringing current, the second substation would be provided with ringing facilities which are responsive to 50 C. P. S. ringing current, etc. The five substations would be assigned different third digit directory number designations and one of the ringback tones 165a to 169a, inclusive, would be selected in the connector in response to the dialing of a third digit at the calling substation.

In the event that more than five substations up to a maximum of ten are associated with one of the lines of the system, the group of substations is divided into pairs and each pair of substations is provided with ringing facilities responsive to the same ringing frequency. Thus, for example, the substations A' and B' associated with the line 94 and assigned the directory number designations "941" and "942" would both be provided with ringing facilities responsive to the same ringing current, for example, a 66⅔ C. P. S. ringing current. If the calling subscriber wishes to call substation A', he dials the number "941," and the connector responds to the third digit of "1" by selecting the ringback tone signal 165a so that a 66⅔ C. P. S. ringing current is transmitted over the called line 32 during the entire first ringing period. Only the ringers at the substations A' and B' will then be rung for a period of approximately one and one-half seconds, and the subscriber at the substation A' will know that the call is intended for him. On the other hand, if the calling subscriber wishes to call the substation B' associated with the line 94, he dials the number "942" and the connector responds to the third digit of "2" by selecting the ringback tone signal consisting of the short pulses 170a and 171a which control the application of 66⅔ C. P. S. ringing current the line 32 so that the ringing facilities at both the substations A' and B' are rung in two short rings. The subscriber at the substation B' is then notified that his substation is being rung.

Figure 12:
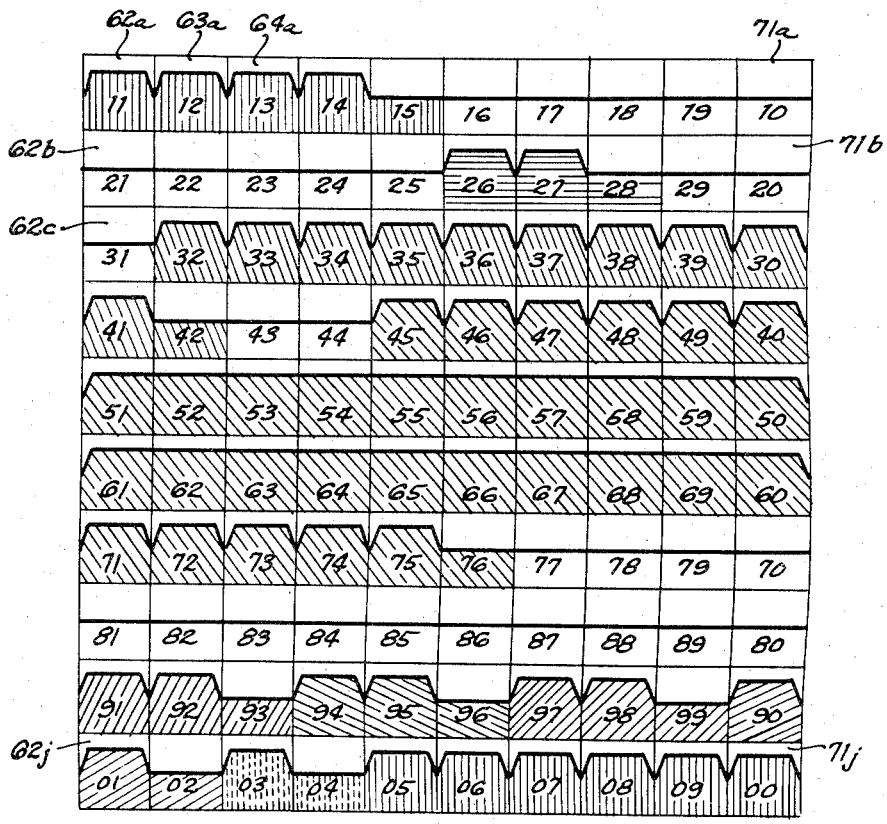

In order to render the mode of operation of the trunk hunting facilities in the links of the service A group more readily understandable, a trunk marking pulse chart has been illustrated in Fig. 12 to show the time and phase relationship of the trunk marking pulses developed by the trunk marking pulse generator 56 in the common equipment 17. Referring to this figure, the one hundred time positions which comprise one pulse frame are illustrated as a series of ten horizontal strings of blocks corresponding to the ten tens digit levels of the lines of the system. In each of the blocks there is shown the directory number designation of the line which is assigned the corresponding units time position. The first units time position 62a in each time position frame is assigned to the line having the directory number designation "11," the second units time position 63a in each time position frame is assigned to the line having the directory number designation "12," the third units time position 64a in each time position frame is assigned to the line having the directory number designation "13," and the tenth units time position 71a is assigned to the line having the directory number designation "10." In the second tens digit level the eleventh units time position 62b in each time position frame is assigned to the line having the directory number designation "21," and the twentieth units time position 71b in each time position frame is assigned to the line having the directory number designation "20."

In order to mark certain lines of the system as private branch exchange trunks, the trunk marking pulse generator 56 selects certain ones of the units pulses supplied thereto over the multiple conductor cable 31 and gates the selected units pulses by means of appropriate tens pulses supplied thereto over the multiple conductor cable 32 to provide trunk marking pulses which occur once in each time position frame in particular units pulse time positions, the last line in each trunk group being unmarked.

In the trunk marking pulse chart of Fig. 12 there are shown nine different private branch exchange trunk groups. One of these trunk groups is comprised of the lines having the directory number designations "32" to "42," inclusive, and the trunk marking pulse generator 56 operates to develop trunk marking pulses during each of the time positions assigned to these lines except the last line 42. It will be evident from Fig. 12 that this trunk group includes lines which are positioned in different tens digit levels. Thus, the lines 32 to 39, inclusive, and 30 are located in the third tens digit level, whereas the lines 41 and 42 are located in the fourth tens digit level. Since the line 42 is the last line in this trunk group no trunk marking pulse is produced in the time position 63d assigned thereto. A second trunk group is shown as comprising a group of thirty-two lines starting with the line 45 and end with the line 76. Accordingly, trunk marking pulses are produced in all of the consecutive time positions assigned to these lines except the last line 76. It will be noted that this trunk marking group of thirty-five lines includes lines having four different tens digit directory number designations. A third trunk group is illustrated as comprising the lines 91, 92 and 93, the lines 91 and 92 being marked by trunk marking pulses. In a similar manner the lines 94, 95 and 96 comprise a fourth trunk group, and the lines 97, 98 and 99 comprise a fifth trunk group. The lines 90, 01 and 02 comprise a sixth trunk group, only the lines 90 and 01 being marked by corresponding trunk marking pulses produced in their respective time positions. A two-line trunk group is shown as comprising the lines 03 and 04 constituting the seventh trunk group. The eighth trunk group includes a plurality of lines in the tenth tens digit level and also a plurality of lines in the first tens digit level. Thus, the eighth trunk group comprises the lines 05 to 09, inclusive, 00 and 11 to 15, inclusive. It will be noted that the eighth trunk group includes lines in the last tens digit level as well as the first tens digit level so that the trunk hunting facilities of the system are capable of hunting not only through different tens digit levels but from the last time position to the first time position, i. e., from the time position 71j to the time position 62a. A ninth trunk group is illustrated as comprising the three lines 26, 27 and 28, the lines 26 and 27 being marked by corresponding trunk marking pulses. It will also be understood that the marking of different lines of the system as trunks has effect only when calls are directed to these lines, i. e., the lines are called lines, and is separate and distinct from the above-described restricted service marking system whereby the lines are restricted as to the type of service available thereto when calls are initiated on these lines. Thus, the line 32 is shown as a member of a trunk group when this line is the called line involved in the connection, whereas this same line is marked as a member of the service B group, and when the line 32 is used as a calling line, the call is routed by way of the service B links which have no trunk hunting facilities.

OPERATION OF THE SYSTEM AS A WHOLE

Considerating now the operation of the system of the present invention, a call will first be traced from the substation B' associated with the party line 32 to the substation A associated with the private line 23. It is assumed that the finder-connector link 12 is idle at the time this first call is initiated on the line 32 so that the call is completed through this link. Since the calling line 32 is, in the illustrated embodiment, a member of the service C group, the lines of which are to be subjected to conversation timing, the link 12 and more particularly the connector 12b thereof, functions to limit the duration of the call initiated on the line 32 in a manner to be more fully described hereinafter. The second call will then be traced from the substation A on line 23 to the substation B' on line 32, it being assumed that the finder-connector link 12 is again idle so as to complete the call through this link. Since the line 23 is, in the illustrated embodiment, a member of the service A group, the lines of which are to receive trunk hunting or consecutive number hunting facilities and to have no restrictions on the duration of the call, i. e., the highest illustrated grade of service, the link 12 will function to provide consecutive number hunting in conjunction with the selection of the called line 32 and no conversation timing facilities will be invoked to limit the duration of this call. The other call will then be traced from line No. 2 (not shown) to the line 32 through the finder-connector link 12. Since the line No. 2 in the illustrated embodiment, is a member of the service B group wherein the trunk hunting facilities are not provided but conversation timing is not required, i. e., an intermediate grade of service, the link 12 will function to complete the call without the benefit of trunk hunting or consecutive number hunting in connection with the called line 32, but will not function to limit the duration of the call.

In considering the placement of the above described calls, the operation of the connector 12b will be described only in sufficient detail to permit understanding of the restricted service facilities of the present invention, reference being had to my copending application Serial No. 301,215, identified above, for a complete detailed description of the operation of this connector in setting up an unrestricted call wherein trunk hunting and conversation timing facilities are provided for all lines.

Considering now the first call initiated on line 32 and intended for line 23, when the receiver or hand set at the substation B' is lifted from its supporting hook or cradle to initiate the call on the line 32, a loop circuit including the conductors of this line, is closed to the line circuit 16 with the result that this line circuit immediately operates to change the magnitude of the bias potential which it delivers over the conductor 45b to the gating circuit of the multiplexer 11 which individually corresponds to the line 32. As a result, the gate circuit in the multiplexer 11 is opened and multiplexer signal pulses 83c occurring during the pulse time position 63c assigned to the line 32 are permitted to pass over the common conductor 50 to the pulse input circuits 202 of the finders of the system to the in gate circuits 207 and 223 in each of the connectors of the system in parallel. At this point, the pulses transmitted from the multiplexer 11 over the common conductor 50 may be regarded as multiplexer pulses 83c.

In the illustrated embodiment, the finder-connector links of the system are arranged in a predetermined sequence and are allotted one at a time to successive calling lines of the system by means of the self-allotting circuits 206 contained in each of the finders 12a, 13a and 14a. Furthermore, such allotment of the finders to successive calling lines is performed irrespective of the restricted service group classification of the calling line so that any one of the finder-connector links of the system may be employed to handle the call originating on any line of the system even though different lines may have different restricted service requirements. Initially, only the link 12 is conditioned by means of the finder 12a to handle a call placed on the calling line of the system. However, when the link 12 is taken into use the circuit 206 in the finder 12a diverts a supervisory carrier signal to the finder 13a in the link 12 to condition this link to handle the next succeeding call, only the link 12 is conditioned to handle the first call and the connector 12b of this link is as yet inoperative so that only the finder 12a initially responds to the multiplexer pulses 83c delivered thereto over the conductor 50.

In the finder 12a, the multiplexer pulses 83c are repeated by the pulse input circuit 200 to effect substantially the immediate operation of the +B switching circuit 201 embodied in this finder whereby operating anode potential is delivered to the tubes in the circuits 209, 211, 212, 215, 216, 218, 219, 264, 265 and 285 in the connector 12b over the +B switch conductor 12c with the result that the connector 12b is conditioned for operation, i. e., conditioned to respond to signal carrying multiplexer pulses delivered thereto from the multiplexer 11 over the conductor 50. Operation of the +B switching circuit in the finder 12a also has the effect of conditioning the tens and units coincidence tube circuits 203 and 204 of this finder for operation so that these circuits are conditioned to register the tens and units pulse time positions of the calling line 32 and these circuits cooperate with the finder pulse forming circuit 205 and the combining circuit 202 in the finder 12a to produce finder gate pulses which are transmitted over the conductor 12d to the circuits 207, 208, 226, 197 and 198 in the connector 12b. Transmission of the finder gate pulses over the conductor 12d to the circuits 207, 208 and 226 in the connector 12b has the effect of initially limiting the response of the connector only to multiplexer pulses 83c appearing in the pulse time position 63c. Also, the transmission of finder gate pulses over the conductor 12d to the circuits 197 and 198 has the effect of conditioning the restricted service gate circuit 197 and the restricted service gate circuit 198 to set up the particular type of service required by the calling line 32. Thus, in the illustrated embodiment wherein the line 32 is to be subjected to conversation timing, the restricted service gate circuit 197 functions to condition the conversation timing facilities for operation in the event that the call is completed to the called line 23. More specifically, the finder gate pulses which are developed on the conductor 12d in the time position 63c assigned to the calling line 32 are compared with the restricted service marking pulses appearing on the conductor 196a. If the finder gate pulses on the conductor 12d occur coincidentally with the restricted service marking pulses on the conductor 196a, the circuit 197 functions to change the potential on the output conductor 197a in the positive direction so as to enable the party register advancer 282 to function as a portion of the conversation timing facilities in the event that the call is completed, as will be described in more detail in connection with the conversation timing operation in the connector 12b. It will be understood that the above described operation of the restricted service gate circuit 197 takes place while the call is being set up in the connector 12b so that by the time the call is completed and the called line answers, the party register advancer 282 will be conditioned to perform its proper function in the conversation timing operation.

When operating anode potential is supplied to the connector 12b, the dial tone gate tube in the network 225 of this connector functions to transmit a dial tone signal to the calling line outgate circuit 226 over the conductor 244. This circuit, in responding to the dial tone signal and also to the finder gate pulses delivered thereto over the conductor 12d and the commutator drive pulses 96a delivered thereto over the conductor 35, functions to repeat over the channel conductor 51 to the distributor 15 connector signal pulses modulated in accordance with the dial tone signal in the time position 64b assigned to the calling line. As a result, the dial tone signal is transmitted by way of the distributor 15 and the line circuit 10 to the calling subscriber so that he is informed that the dialing operation may be initiated.

The connector 12b responds to the first two digits of dial impulses which are dialed into this connector by selecting the time position assigned to the called line 23 and also responds to the third digit dialed into this connector by selecting the party line ringing signal assigned to the called substation A having the directory number designation "231" assigned thereto. During the open circuit period of each dial impulse, the control bias supplied by the circuit 16 to the gate circuit of the multiplexer 11 assigned to the calling line 32 is returned to its on-hook value so as to interrupt the transmission of multiplexer pulses 83c over the conductor 50 to the pulse input circuit 200 of the finder 12a and to the in gate circuits 223 and 207 in the connector 12b.

The intelligence and control signals thus modulated on the multiplexer pulses 83c are transmitted through the circuits 207 and 208 to the dial impulse integrator circuit 209, this latter circuit responding only to control signals so that control pulses are developed thereto during each dial impulse which are impressed upon the tens units and party inverter circuits 260, 261 and 262 over the conductor 227. In the illustrated call the circuit 209 develops two control pulses corresponding to the first digit of "2," and these pulses are transmitted through the tens inverter circuit 260 and cause the tens register pulser 210 to develop corresponding register drive pulses of uniform amplitude and duration which are supplied to the tens digit register 211 and the tens sequence timing circuit 212 over the conductor 230. As a result, the register 211 is driven to a setting wherein tens pulses appearing on the positive tens pulse conductor 32b are transmitted through the second tens gate of this register and over the conductor 232 to the connector pulse forming circuit 217. At the end of the first digit the pulser 210 is blocked by the tens sequence timing circuit 212 so that it does not develop register drive pulses during the second and third digits and the units inverter circuit 261 is conditioned to transmit therethrough the pulses developed by the circuit 209 during dialing of the second digit. As soon as the register 211 is driven off normal, a control potential is developed on the conductor 233 which biases the dial tone gate tube of the network 225 beyond cutoff so that the dial tone transmission over the conductor 244 to the calling line out gate circuit 226 is terminated.

During the interdigit pause which separates dialing of the first and second digits, the circuit 212 develops a control potential on the conductor 234 which is employed to block the pulser 210 and to enable the units inverter circuit 261. During dialing of the second digit "3" by the calling substation B', the circuit 209 responds by developing three impulses which are transmitted through the units inverter circuit 261 to the pulser 214 and the circuit 214 develops corresponding register drive pulses which are supplied to the units digit register 215 and the units sequence timing circuit 216 over the conductor 236. As a result, the register 215 is driven to open the third units gate circuit therein thereby to establish a path for the transmission of units pulses appearing in the time positions 64a, 64b, 64c, etc., to the connector pulse forming circuit 217 over the conductor 245.

During the interdigit pause which separates dialing of the second and third digits at the calling substation, the circuit 216 develops a potential on the conductor 235 which biases the pulser 214 against conduction and enables the party inverter circuit 262. The potential developed on the conductor 235 is also supplied to the tens register advancer 280, the trunk hunting control circuit 283, the busy test circuit 218 and the busy lock circuit 219.

The circuit 217 combines the tens and units pulses transmitted thereto over the conductors 232 and 245 so as to produce a connector pulse in the called line time position, i. e., the time position 64b, these pulses being transmitted over the conductor 239 to the connector units 222, 223, 224 and 283 and over the conductor 239b to the circuit 220. The circuit 217 also selects one of the commutator drive pulses 96a which occurs in the called line time position 64b, these busy test pulses being transmitted over the conductor 239a to the busy test circuit 218.

The circuits 218 and 219 cooperate to perform the busy test operation in the connector 12b so that, if busy pulses are present on the common busy pulse in-conductor 52b in the time position 64b assigned to the called line 23, the busy lock circuit 219 transmits a bias potential over the conductor 248 to the circuit 218 which blocks the busy test circuit and the circuit 219 also transmits a control potential over the conductor 250 to the busy tone gate in the network 225 so that a busy tone signal derived from the conductor 46 is transmitted by way of the conductor 244, the calling line out gate circuit 226, the conductor 51, the distributor 15 and the line circuit 16 to the calling subscriber so that he is advised of the busy condition of the called line. If the called line 23 is idle, the busy test circuit 219 develops a positive cut-through potential on the conductor 251a which is transmitted to the circuit 219 to prevent the latter circuit from operating at the end of the busy test interval and is also applied to the units register advancer 281 over the conductor 289 to prevent this circuit from initiating a trunk hunting or consecutive number hunting operation, as will be described in more detail hereinafter. The circuit 218 also develops a potential on the conductor 251 which is applied to the circuit 224 to condition this circuit to repeat connector signal pulses in the time position 64b to the distributor 15, and it is also applied to the busy gate circuit 220 so that busy pulses in this time position are released to the common busy pulse out-conductor 52a. The potential on the conductor 251 is also applied to the circuits 222 and 223 to condition the same to accept signals derived from the calling line.

As described heretofore, the calling line 32 is a member of the service C group and hence is not entitled to consecutive number hunting facilities even though the called line is a member of a trunk group. Accordingly, if the called line 23 tests busy, the trunk hunting facilities in connector 12b are not permitted to function, but instead the busy lock circuit functions at the end of the busy test interval to lock up the connector and return the busy tone signal to the calling subscriber as described above so that he is advised of the busy condition of the called line. However, the conversation timing facilities in the connector 12b which includes the party register advancer 282, the conversation timing warning tone circuit 284, the party digit register 265 and the conversion timing control circuit 285 are conditioned by means of the restricted service gate circuit 197 so as to time the duration of the call if it is answered at the called line 23.

Assuming that the line 23 is idle when called, the calling line out gate circuit 224 is conditioned by the above described potential impressed upon the conductor 251 so that very narrow connector signal pulses are released to the conductor 51 which are well within the time limit of the pulse time position 64b assigned to the called line, these connector signal pulses being developed by gating certain ones of the commutator drive pulses appearing on the conductor 35.

The above described busy test operation is performed during the interdigit pause which separates the second and third digits. During dialing of the third digit "1" at the calling substation A, the circuit 209 responds by developing one impulse which is transmitted through the party inverter circuit 262 to the pulser 263, this latter circuit developing a corresponding register drive pulse which is transmitted over the conductor 240 to the register 265 and the party sequence timing circuit 264. As a result, the register 265 is driven to open the first party gate circuit therein, so as to establish a path for the transmission of the interrupted ringback tone signal (Fig. 11(13)) which corresponds to the code #1 party line ringing signal assigned to the called substation A over the conductor 275 to the ringback tone gate tube in the network 225.

At the end of the third digit the timing circuit 264 develops a potential on the conductor 242 which blocks the party register pulser 263 and renders the code start circuit 268 operative to develop a control potential in response to the next occurring code start pulse developed on the conductor 5. The control potential developed by the circuit 268 is transmitted by way of the conductor 241 to the ringback tone gate tube in the network 225 so that the interrupted ringback tone signal corresponding to the code #1 party line ringing signal selected by the party digit register 265 is transmitted to the calling line out gate circuit 226 over the conductor 244 so that the calling subscriber is informed that the substation A is being rung during the ringing intervals of the signal assigned to the called substation A. The ringback tone signal transmitted through the ringback tone gate circuit is also rectified to reproduce the party line ringing signal originally developed in the code forming circuit 99, and the ringing pulses resulting from such rectification are transmitted over the conductor 295 to the called line out gate circuit 224 wherein they have the effect of increasing the amplitude of the connector signal pulses by approximately 50% during each ringing pulse period. These large amplitude signal pulses control the ringing facilities in the line circuit 10 so that a 66⅔ cycle per second ringing current is transmitted over the line 94 during the two short ringing intervals of the substation B' ringing signal.

When the call is answered at the substation A the line circuit 10 functions to change the magnitude of the control potential supply over the conductor 53b to the multiplexer 11 with the result that multiplexer pulses 84b are transmitted over the conductor 50 to the multiplexer input terminals of each of the finders and connectors of the system. Since the gate circuit 220 in the connector 12b impresses busy pulses on the common busy pulse in-conductor 52b, only the connector 12b responds to the multiplexer pulses 84b so that these pulses are transmitted through the called line in gate circuit 223 thereof and are impressed upon the reconstructor circuit 222. The circuit 222 responds to this call answering signal by developing a potential on the conductor 252 which is transmitted to the ring trip circuit 221 and causes this latter circuit to operate. In operating the circuit 221 develops a positive potential on the conductor 253 which is effective to close the ringback tone gate circuit in the network 225 so that the transmission of the ringback tone signal to the calling substation is arrested. At the same time, the amplitude of the connector signal pulses is reduced to the normal value so that the ringing operation is arrested.

Following the described operations in the connector 12b, a two-way talking or communication circuit is fully established between the party line calling substation B' and the called substation A. Since the calling line 32 is a member of the service C group wherein the lines are to be restricted as to the duration of the call, the connector 12b should initiate the conversation timing facilities when the call is answered at the substation A. As described generally heretofore, as soon as finder gate pulses are transmitted over the conductor 12d to the connector 12b, these finder gate pulses are compared with the restricted service marking pulses appearing on the conductor 196a. Since the line 32 is a member of the service C group and restricted service marking pulses are produced in the time positions assigned to the lines of this group, the finder gate pulses and the restricted service marking pulses will coincide in the circuit 197 so that the potential on the conductor 197a increases positively and partially enables the party register advancer 282. However, until the call is answered, the party register advancer 282 remains inoperative to change the setting of the party digit register 265.

When the call is answered at the called substation A, the conversation timing facilities are initiated so that the duration of the call originating on the line 32 is limited to a period of approximately seven and one-half minutes after which time the connection is either broken completely or a busy tone signal is returned to the calling and called subscribers to discourage further continuance of the call. More particularly, in the connector 12b, the positive potential produced on the ring trip conductor 253 in the manner described above, cooperates with the positive potential increase on the conductor 197a to condition the party register advancer 282 so that this latter circuit responds to conversation timing pulses which are developed in the conversation timing pulse generator 57 and are supplied over the common conductor 57a to the party register advancers 282 in each of the connectors of the system. At the same time, the potential on the conductor 253 is supplied to the party digit register 265 to reset this register to zero. Also, the potential on the conductor 253 is employed to condition the conversation timing control circuit 285 for operation at the end of the conversation timing period and this potential is also employed as an anode potential for the conversation timing warning tone circuit 284. The conversation timing pulses are produced at periodic intervals and the party register advancer 282 responds to each conversation timing pulse by producing a register drive pulse which is supplied to the party digit register 265 over the conductor 291 to advance this register one step for each conversation timing pulse, it being understood that the register 265 is no longer required for ringback tone transmission after the called party answers and ringing is terminated. The conversation timing pulses may occur for example, at 40 second intervals so that the party digit register 265 is advanced one stage for each 40 second interval of the call. It will be noted that by employing the party register advancer 282 to change the setting of the register 265 for conversation timing purposes and having the advancer 282 completely independent of the party register pulser 263, which latter circuit is employed to change the setting of the register 265 for party line ringing signal selection, the connector 12b may be employed to provide different types of service either with or without conversation timing facilities. This will be readily apparent when it is realized that the party register pulser 263 must be employed to select the party line ringing signal for each call, irrespective of whether or not the calling line is subjected to conversation timing. However, with the above described arrangement, the conversation timing facilities are completely independent of the party line ringing signal selecting facilities even though the same register is employed for both facilities.

When the ninth counting tube of the party digit register 265 is extinguished by the tenth register drive pulse produced by the party register advancer 282, a positive potential is developed on the conductor 292 which is transmitted to the conversation timing warning tone circuit 284, and this latter circuit responds to the potential on the conductor 292 by transmitting therethrough a short pulse of the warning tone signal impressed upon the circuit 284 from the warning tone generator 58 over the conductor 58a which is common to the links of the service C group. This short pulse of warning tone is transmitted over the conductor 244 to the calling line out gate circuit 226 and is also transmitted over the conductor 294 to the called line out gate circuit 224 so that both the calling and called subscribers are informed that the call is about to be terminated.

When the tenth counting tube of the register 265 is extinguished by the eleventh register drive pulse produced by the party register advancer 282, a positive control potential is developed on the conductor 293 which is transmitted to the conversation timing control circuit 285 in the connector 12b. The circuit 285 responds to the positive potential produced on the conductor 12e. In one embodiment of the conversation timing facilities the positive pulse developed on the conductor 12e is transmitted back to the finder 12a and is applied to the cathode of the +B switch tube in the +B switching circuit 201 of the finder 12a. As a result the +B switch tube in the circuit 201 is extinguished so that operating potential is removed from the conductor 12c and the finder-connector link 12 is no longer operatively associated with the calling and called lines. Under these conditions both the calling and called lines call in new linkage and dial tone is returned to both the calling and called subscriber to inform them that the connection has been broken and that they should hang up.

In the alternative conversation timing arrangement, the positive pulse developed on the conductor 12e is impressed upon the busy test tube in the busy test circuit 218 of the connector 12b so that this tube is extinguished and cutthrough potential is removed from the conductors 251 and 251a with the result that the connector is made busy at the end of the conversation timing period and returns a busy tone signal to the calling subscriber. Since the called line is no longer busied by the busy gate circuit 220 in the connector 12b, the called line immediately thereafter calls in new linkage and receives dial tone to inform the called subscriber that the call has been automatically terminated by the conversation timing facilities. In this connection it will be understood that the conversation timing warning tone circuit 284 and the conversation timing control circuit 285 are provided with facilities for preventing these circuits from responding falsely to potentials developed by the party digit register 265 during the selection of the party line ringing signal by the register 265 during the dialing operation, as described in detail in my copending application, Serial No. 301,215 identified above. It will also be understood that the above described restriction as to the duration of the call which is impressed upon the lines in the service C group is shown merely for purposes of illustration, and other types of restricted service may equally well be employed insofar as the overall restricted service facilities of the present invention are concerned.

Considering now the initiation of a call on the line 23 and intended for the line 32, it will be recalled that the line 23 is a member of the service A group in which group each line is entitled to trunk hunting or consecutive number hunting facilities and is not limited as to the duration of the call. Assuming that this second call is initiated at the substation A, when the receiver at this substation is lifted off its supporting hook or cradle line circuit 10 functions to change the value of the bias potential which it delivers over the conductor 53b to the gate circuit of the multiplexer 11 which individually corresponds to the line 23. As a result, multiplexer signal pulses 84b are developed on the conductor 50 and are transmitted to all of the finders and conductors of the system. Assuming that finder 12a is allotted by means of the self allotting circuit 206 thereof to receive this call, the multiplexer pulses 84b enter the pulse input circuit 200 of the finder 12a with the result that this finder becomes operatively associated with the line 23 and impresses a +B switch potential on the conductor 12c which is transmitted to the connector 12b to condition the same for operation in the manner described above. At the same time, the finder 12a functions to develop finder gate pulses in the time position 64b assigned to the line 23 and these finder gate pulses are transmitted over the conductor 12d to the connector 12b.

In the connector 12b, the finder gate pulses impressed upon the conductor 12d are transmitted to the restricted service gate circuit 198 in this connector wherein they are compared with the restricted service marking pulses developed on the conductor 196a by the restricted service marking generator 196. It will be recalled that the line 23 is, in the illustrated embodiment, shown in the service A group in which group the lines are entitled to the use of trunk hunting facilities and the restricted service marking pulses produced on the conductor 196a occur in each of the time positions assigned to the lines in the service A group. Accordingly, the finder gate pulses coincide with the restricted service marking pulses on the conductor 196a and the circuit 198 functions to increase the potential on the conductor 198a positively so as partially to enable the units register advancer 281. However, until the end of the second digit dialed into the connector 12b, the units register advancer 281 remains partially disabled so that it cannot respond to trunk hunting impulses on the conductor 55a.

In responding to the dial impulses constituting digits "3," "2" and "2" of the called substation B' associated with the line 32, connector 12b functions in the manner substantially identical to that described above in connection with the first described call to set up the call between the substations A and B'. However, if the called line 32 is busy, the circuits 283, 280 and 281 cooperate to perform the trunk hunting operation in the connector 12b so as to hunt for an idle line within the called trunk group including the line 32. More specifically, if the called line 32 is busy, the corresponding busy pulses on the conductor 52 will coincide with the connector pulses developed on the conductor 239 and the trunk marking pulses developed on the conductor 56a. As a result, the control circuit 283 develops a control potential which is transmitted over the conductor 288 to the units register advancer 281. The circuit 281 is jointly controlled by the potential on the conductor 198a and the potential on the conductor 288 so that if positive potentials are simultaneously present on these conductor, the advancer 281 is set to respond to trunk hunting drive pulses which are transmitted to the circuit 281 over the conductor 55a. After it is enabled, the advancer 281 develops corresponding register drive pulses which are transmitted over the conductor 290 to the units digit register 215 and advances the setting of this register by one time position for each trunk hunting drive pulse. The busy test operation is performed for each new time position of the connector pulses until an idle line within the called trunk group is found, at which time the control potential on the conductor 288 is removed and the units register advancer 281 is disabled. If the last line in the called trunk group is busy, the busy lock circuit 219 blocks busy test circuit 218 at the end of the busy test interval and the busy tone signal is transmitted to the calling subscriber in the manner described above. It will be noted that by employing the circuits 214 and 281 to change the setting of the units digit register 215, the connector 12b may be used to set up calls originating on lines which do not receive trunk hunting as well as those lines of the system which do receive trunk hunting. This is readily apparent if it is realized that the units register pulser 214 must operate to register the units time position of the called line for each call independently of whether or not the line is entitled to trunk hunting. However, by employing a separate units register advancer 281 for trunk hunting control, both types of service may be given while employing a single units digit register.

If the trunk hunting or consecutive number hunting operation is successful and an idle line in the called trunk group is selected, the call is completed in the manner described above. However, since the second illustrated call originated on the line 23 which is not objected to conversation timing, when the called line 32 answers the conversation timing facilities in the connector 12b are not enabled and the duration of the call is not limited. This will be readily apparent when it is realized that the finder gate pulses appearing on conductor 12d in the time position assigned to line 23, do not coincide with restricted service marking pulses on the conductor 195a so that the restricted service gate circuit 197 is not operated and the potential on the conductor 197a thereof, remains at a relatively low value such that the party register advancer 282 is prevented from responding to conversation timing pulses on the conductor 57a even though a positive ring trip potential is developed on the conductor 253. Accordingly, a call initiated on line 23 may continue as long as the subscribers desire.

Considering now, the placement of a call from one of the lines in the service B group such as the line No. 2 (not shown) and intended for any one of the other lines of the system such as the line 32, when the call is initiated at the substation associated with the line No. 2, multiplexer pulses appearing in the time position 63j assigned to the line No. 2 are developed by the multiplexer 11 on the conductor 50 and are transmitted to all of the finders and connectors of the system. Assuming that the link 12 becomes operatively associated with the line No. 2 in the manner described above in connection with the other calls, when this occurs the finder 12a functions to impress finder gate pulses on the conductor 12d in the time position 63j assigned to the line No. 2 and these pulses are transmitted to both of the restricted service gate circuits 197 and 198 in the connector 12b. However, since the restricted service marking generators develop pulses only in the time position assigned to their particular service group, i. e., the service A and service C groups, no restricted service marking pulses are developed on either the conductor 196a or the conductor 195a in the time position 63j assigned to the line No. 2 so that the potential on the conductors 197a and 198a are not changed and the trunk hunting facilities as well as the conversation timing facilities remain disabled in the connector 12b for the duration of the call initiated on the line No. 2. In other respects, the operation of the connector 12b in completing the call to the line 32 is the same as that described above in connection with the first and second calls and the two-way talking circuit is accordingly established between the lines No. 2 and No. 32 when the called line 32 answers. In this connection, it will be understood that the above described trunk hunting facilities and conversation timing facilities, may be controlled in any desired manner to effect the above described restricted service operation. For example, the conversation timing facilities may be made normally operative so that they function to limit the duration of each call and the restricted service marking pulses may be produced in the time positions assigned to the lines which are not to receive conversation timing in which case the conversation timing facilities would be disabled upon coincidence of the finder gate pulses and the restricted service marking pulses. It will also be understood that any suitable pulse source, other than the illustrated finder gate pulses, which is indicative of the time position assigned to the calling line with which the connector is operatively associated, may be employed to control the restricted service operation in the connector as will be readily apparent to those skilled in the art. It will further be understood that the restricted service marking pulses and finder gate pulses or their equivalent may be of either polarity as desired so long as a coincidence between these pulses indicates that the calling line is a member of the particular restricted service group. In this connection, it is pointed out that any other restricted service may be provided by employing an additional restricted service marking generator which is employed to develop pulses in the time positions assigned to the lines which are to be restricted to that service and an additional restricted service gate circuit may be employed to develop a control potential which may be used to initiate the desired facilities in the connector to set up the required restrictions on the service.

DETAILED DESCRIPTION OF THE SYSTEM

In considering the detailed circuitry of the system components briefly described above, operation of these components will be analyzed insofar as possible in terms of the functions which they perform in establishing the above-described connections. Before considering the details of the system components, however, it is pointed out generally that corresponding reference characters have been used throughout the drawings to identify corresponding circuit elements of the system. It is also pointed out that all pulse carrying conductors, such, for example, as the signal pulse transmission conductors 50 and 51 are in the form of coaxial cables or transmission lines having low pulse attenuating properties at the pulse frequencies employed. In certain instances, the coaxial cables provided to connect two or more components of the system have been illustrated, but it should also be remembered that all of the other illustrated pulse carrying conductors are of the proper type. On the other hand, all ilustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuits, namely functions which will be readily understood by those skilled in the art, have not been identified in the drawings or referred to in the following description of the system components.

As used in this specification, the terms electronic and electronic means refer to and are intended to define means comprising electron conducting devices, such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches, and the like.

In order to reduce the complexity of this specification, those system components which are substantially identical to the corresponding system components of the copending applications, Serial No. 134,974 and Serial No. 301,215 identified above, will be only briefly described in this specification, reference being had to these copending applications for a complete and detailed description of the particular system components.

*Common equipment 17*

With the exception of the restricted service marking generators 195 and 196, the component units of the common equipment 17 shown in Fig. 4 of the drawings may all be substantially identical to the corresponding system components shown and described in detail in my copending application Serial No. 301,215, identified above, so that a detailed description thereof is considered unnecessary herein. It is also pointed out that this common equipment may be employed to supply pulses to other exchanges which do not have the above described restricted service features, in which case connections from the generators 195 and 196 to the connectors of these other exchanges would be omitted.

*Restricted service marking generator 195*

Figure 18:
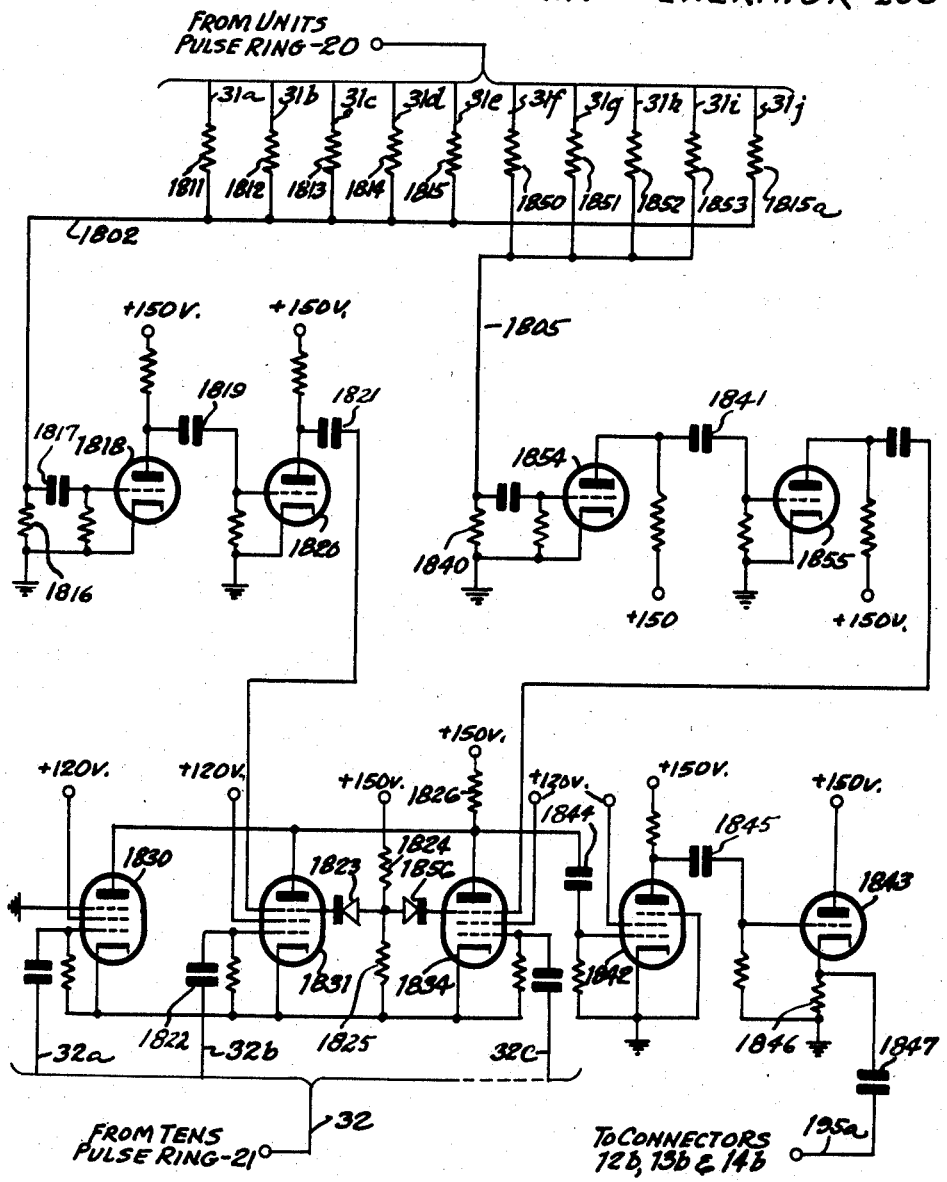
Figs. 18 and 19 illustrate the details of the restricted service marking generators of the system as in the Figs. 1 to 4, inclusive.

As described generally heretofore, the restricted service marking generator 195 which is shown in detail in Fig. 18 of the drawings is provided for the purpose of developing restricted service marking pulses on the conductor 195a which are transmitted to the restricted service gate circuits 197 in each of the connectors of the system and are used for control purposes in conjunction with the finder gate pulses to set up the particular service required in accordance with the restricted service classification of the calling line with which the connector is operatively associated.

In the illustrated embodiment, the lines numbered 10 to 25, inclusive, and 56 to 59, inclusive, have been arbitrarily designated as the service A lines so that the generator 195 is arranged to provide restricted service marking pulses in the time positions assigned to these lines. These restricted service marking pulses may conveniently be derived by selection and combination of different ones of the units and tens pulses developed by the units pulse ring circuit 20 and the tens pulse ring circuit 21.

In order to produce restricted service marking pulses in the time positions assigned to the lines numbered 21 to 25, inclusive, it is necessary to combine the units pulses appearing on the conductors 31a, 31b, 31c, 31d and 31e and then gate the combined units pulses by means of tens pulses appearing upon the conductor 32b so that restricted service marking pulses appearing in the time positions 62b, 63b, 64b, 65b, and 66b are developed. Since lines numbered 10 to 19, inclusive, occur in the same tens digit level, it is not necessary to combine units pulses to produce restricted service marking pulses in these time positions but instead the tens pulses appearing upon the conductor 32a may be used directly as blocks of ten restricted service marking pulses in the time positions 62a, 63a, 64a–71a. In order to produce restricted service marking pulses in the time positions assigned to the lines numbered 56, 57, 58 and 59, it is necessary to combine the units pulses appearing on the conductors 31f, 31g, 31h and 31i, and then gate these combined units pulses by means of the tens pulses appearing on the conductor 32e so that restricted service marking pulses are developed in the time positions 67e, 68e, 69e and 70e.

In considering the details of the restricted service marking generator 195, it is pointed out that this generator is basically similar to the trunk marking pulse generator 56 in the common equipment 17 and reference may be had to my copending application, Serial No. 301,215, identified above, for a complete and detailed description of a generator of this type. However, for the purposes of the present invention it may be stated that the units pulses appearing upon the conductors 31a, 31b, 31c, 31d, 31e and 31j are coupled through the isolating resistors 1811, 1812, 1813, 1814, 1815 and 1815a, respectively, to the common units pulse mixing bus 1802 so that a portion of each of these units pulses appears across the common output resistor 1816. The units pulses developed on the mixing bus 1802 are coupled through the condenser 1817 to the control grid of an amplifier tube 1818 wherein they are amplified and inverted and the amplified negative units pulses developed at the anode of the tube 1818 are coupled through the condenser 1819 to a second amplifier tube 1820 wherein they receive further additional amplification and inversion. Accordingly, there is produced at the anode of the tube 1820 positive units pulses which are coupled through the condenser 1821 to the suppressor grid of the second tens gating tube 1831. The tens pulses appearing upon the conductor 32b in the time position 73a are coupled through the condenser 1822 to the first control grid of the tube 1831 and the suppressor grid of this tube is coupled through the clamping rectifier 1823 to a voltage divider including the resistors 1824 and 1825 which are connected from the positive supply potential to ground so that the cathode of the rectifier 1823 is operated at a small positive potential with respect to ground, preferably in the order of sixteen volts. Accordingly, only the units pulses 62b, 63b, 64b, 65b, 66b and 71b are gated by the tube 1831 and appear as negative pulses across the common anode resistor 1826.

In order to develop restricted service marking pulses in the time positions assigned to the lines numbered 56, 57, 58 and 59, the units pulses appearing upon the conductors 31f, 31g, 31h and 31i are coupled through the isolating resistors 1850, 1851, 1852 and 1853, respectively, to the pulse mixing bus 1805 so that a portion of each of these pulses appears across the common output resistor 1840 and is coupled to the control grid of the tube 1854. The pulses appearing at the anode of the tube 1854 are coupled through the condenser 1841 to the tube 1855 wherein they are further amplified and inverted. The pulses appearing at the anode of the tube 1855 are coupled to the suppressor grid of the fifth tens gating tube 1834 and this suppressor grid is connected through the rectifier 1856 to the voltage divider network 1824, 1825. The tens pulses appearing upon the conductor 32e are impressed upon the control grid of the gating tube 1834 so that only the units pulses 67e, 68e, 69e and 70e are gated by the tube 1834 and appear as negative pulses across the common anode resistor 1826. In this connection it will be understood that additional tens gating tubes may be provided as required to develop the restricted service marking pulses in other tens digit levels of the system, as described in detail in connection with the trunk marking pulse generator 56 in my copending application, Serial No. 301,215, identified above. It will also be understood that if individual units pulses are to be impressed upon a particular tens gating tube, the suppressor grid of this tube is connected through a clamping rectifier similar to the rectifier 1823 to the voltage divider 1824, 1825, as will be well understood by those skilled in the art.

The mixed tens and units pulses developed across the common anode resistor 1826 are coupled through the condenser 1844 to the control grid of an amplifier tube 1842 wherein these pulses are amplified and inverted so that positive marking pulses are developed at the anode of the tube 1842. These positive marking pulses are coupled through the condenser 1845 to the control grid of a cathode follower output tube 1843 and are repeated across the cathode resistor 1846 of this tube in like phase. The positive marking pulses developed across the resistor 1846 are coupled through the condenser 1847 to the conductor 195a and are transmitted over this conductor to the connectors 12b, 13b, and 14b of the system. In this connection it will be understood that the generator 195 may be arranged to provide negative marking pulses by merely providing a suitable phase inverter in which case the positive pulses developed at the anode of the tube 1842 are inverted before being impressed upon the conductor 195a. It will also be understood that negative marking pulses may be employed instead of the illustrated positive pulses to control the connectors of the system as will be described in more detail hereinafter in connection with the conductor 12b.

Restricted service marking generator 196

Figure 19:
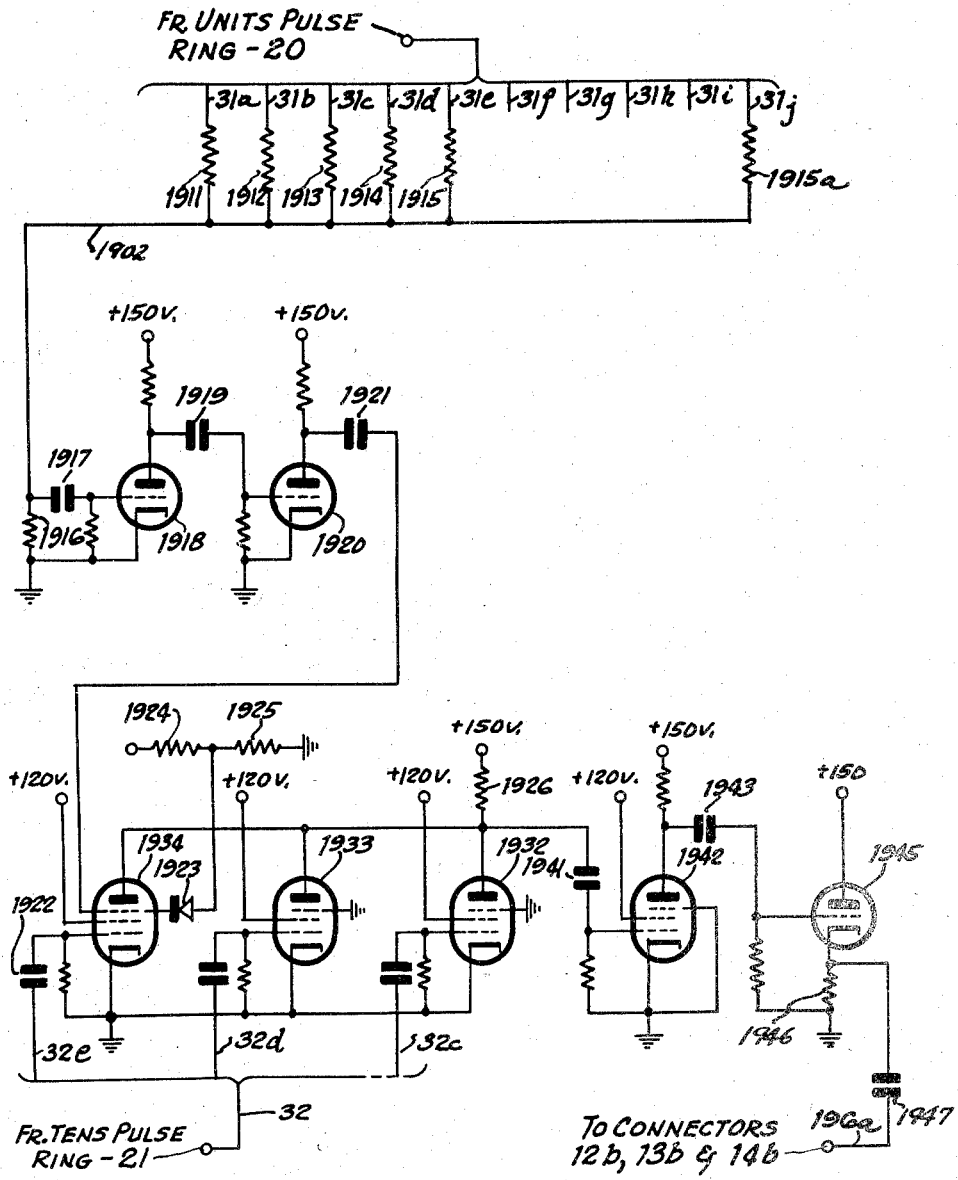
Figures 20, 24:
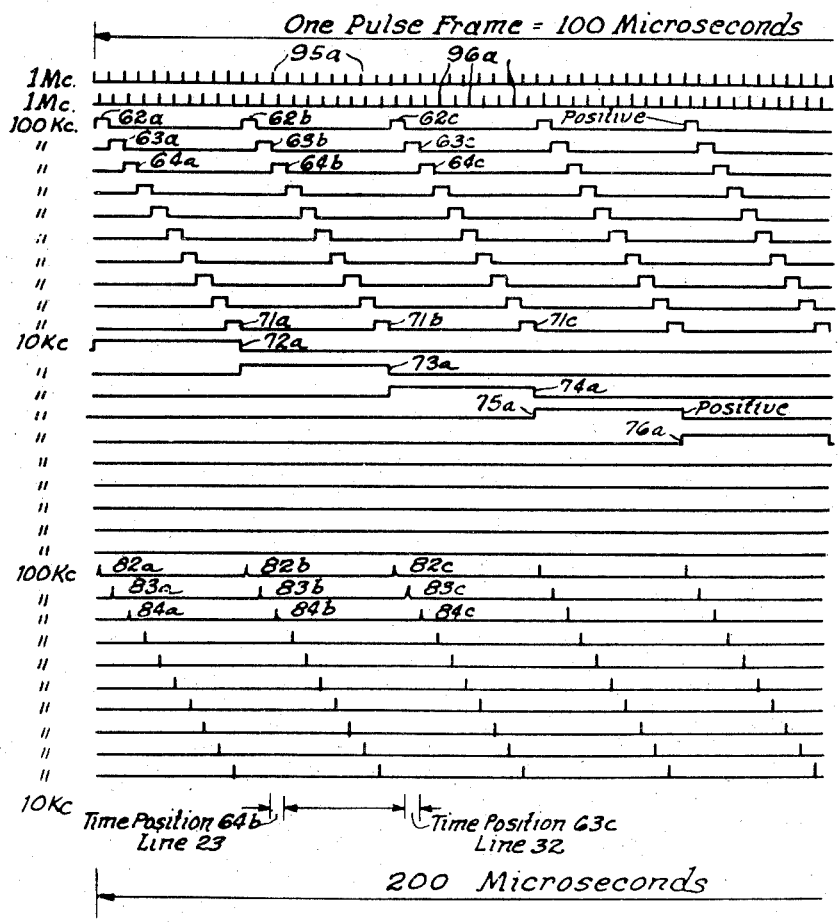
Figs. 20 to 23, inclusive, when laid side by side, graphically illustrate certain other waveforms generated in the system shown in Figs. 1 to 4, inclusive.
Figure 21:
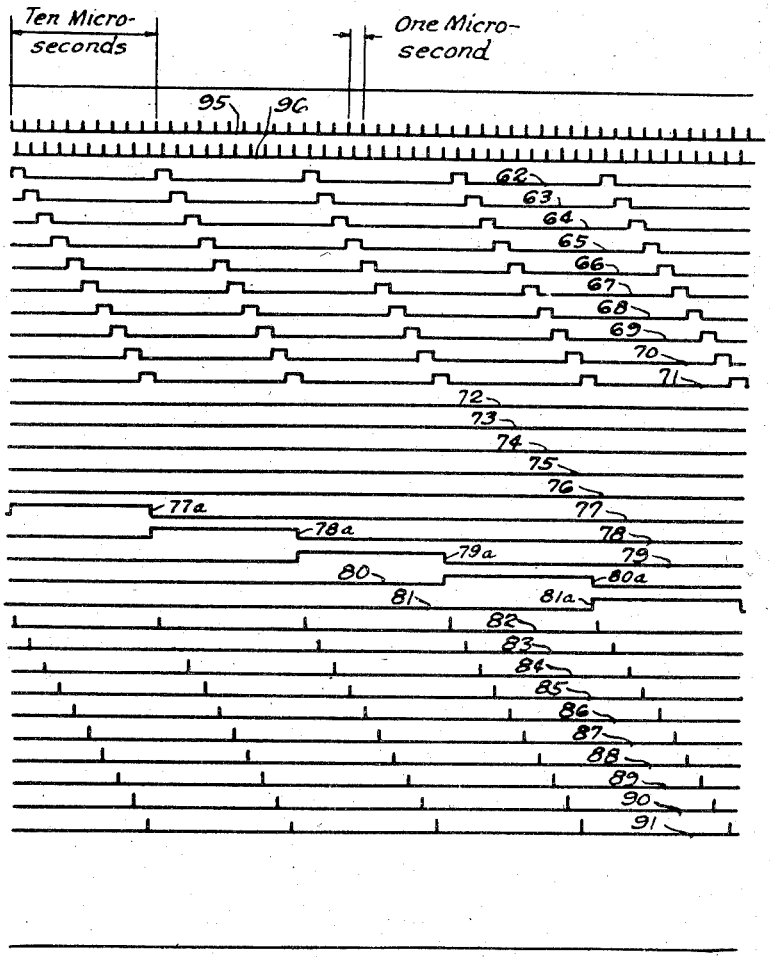
Figure 22:
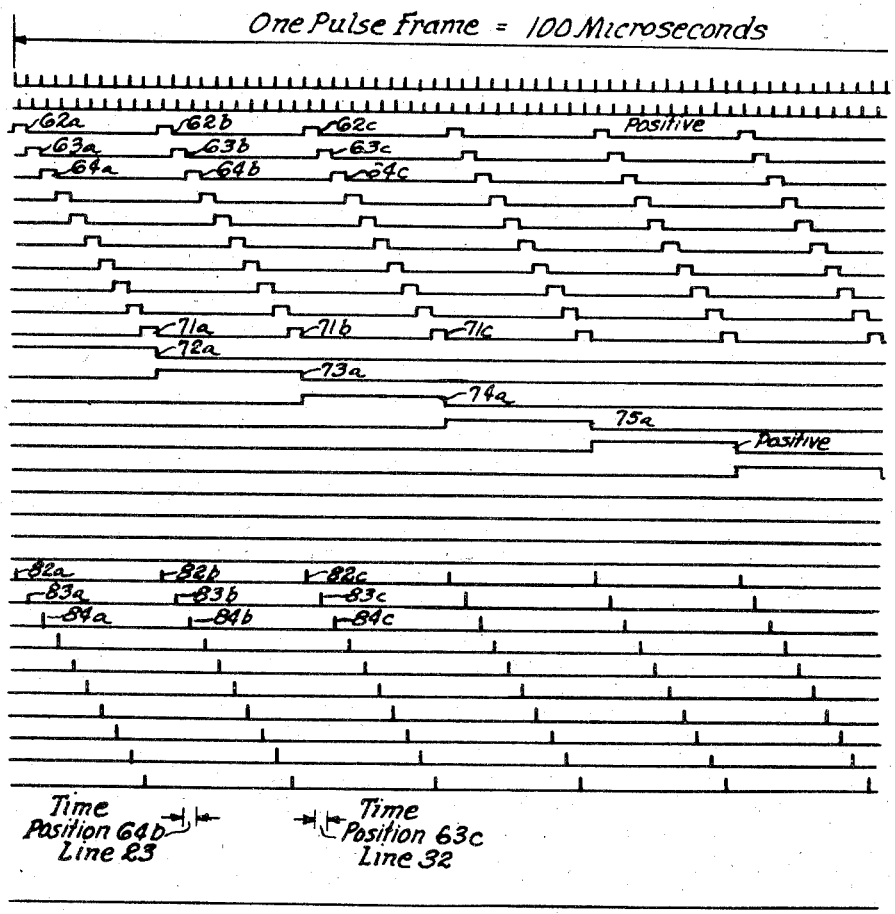
Figure 23:
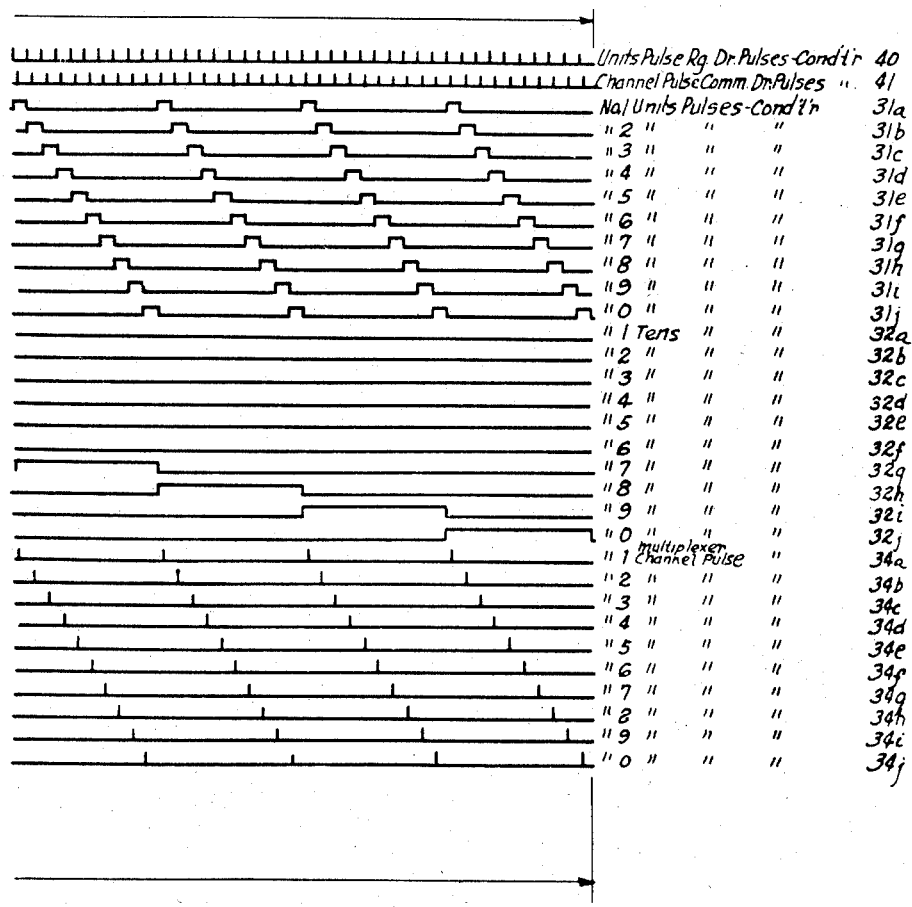

As described generally heretofore, the generator 196, which is shown in detail in Fig. 19 of the drawings, is employed for the purpose of developing restricted marking pulses on the conductor 196a in the time positions assigned to the lines numbered 30 to 55, inclusive, in the Service C group.

In order to provide restricted marking pulses in the time positions assigned to the lines numbered 50, 51, 52, 53, 54 and 55, it is necessary to combine the units pulses appearing on the conductors 31a, 31b, 31c, 31d, 31e and 31j and to gate these combined pulses by the tens pulses 76a appearing upon the conductor 32e. For the remaining time positions the tens pulses may be used directly to provide blocks of ten marking pulses in a manner similar to that described above in connection with the generator 195. In the generator 196 the units pulses appearing upon the conductors 31a, 31b, 31c, 31d, 31e and 31j are coupled through the corresponding isolating resistors 1911, 1912, 1913, 1914, 1915 and 1915a to the second units pulse mixing bus 1902 and are produced across the resistor 1916. The pulses across the resistor 1916 are coupled through the condenser 1917 to the grid of the tube 1918 wherein they are amplified and are coupled through the condenser 1919 to the next amplifier tube 1920. The amplified units pulses developed at the anode of the tube 1920 are then coupled through the condenser 1921 to the suppressor grid of the fifth tens gating tube 1934 and are gated by the tens pulses appearing upon the conductor 32e so that only the units pulses 62e, 63e, 64e, 65e, 66e and 71e are developed across the common anode resistor 1926. A clamping rectifier 1923 is conected to the suppressor grid of the tube 1934 to limit the positive excursions of the suppressor grid as described above in connection with the generator 195.

The remaining marking pulses which are developed by the generator 196 may be derived directly from the tens pulses. Thus, the suppressor grid of the third tens gating tube 1932 is connected to ground and the tens pulses 74a appearing upon the conductor 32c are transmitted through this tube to the common anode resistor 1926 so as to provide marking pulses in the time positions assigned to the lines numbered 30 to 39, inclusive. In a similar manner the fourth tens gating tube 1933 is employed to gate the tens pulses impressed thereon from the conductor 32d so as to produce marking pulses in the time positions assigned to the lines numbered 40 to 49, inclusive. The mixed tens and units pulses appearing across the resistor 1926 are coupled through the condenser 1941 to the control grid of the tube 1942 and the amplified pulses developed at the anode of this tube are coupled through the condenser 1943 to the control grid of a cathode follower output tube 1945 and are repeated in like phase across the cathode resistor 1946 of this tube. The positive pulses developed across the resistor 1946 are coupled through the condenser 1947 to the conductor 196a. The marking pulses developed on the conductor 196a are then transmitted to the conductors 12b, 13b and 14b of the system.

Line circuits 10 and 16

As previously indicated, the above identified line circuits are respectively utilized to terminate the private line 23 and the party line 32 at the exchange end of the system. These line circuits as well as the line circuits terminating the other ninety-eight lines of the system, are identical in circuitry and mode of operation and may be substantially identical to corresponding line circuits described in detail in my copending application Serial No. 301,215 identified above. Accordingly, a detailed description of these line circuits is considered unnecessary in the present application.

*Multiplexer 11*

As pointed out in the general description of the system, this circuit is provided for the general purpose of sampling control and intelligence signals developed on calling and called lines of the system in the time positions of each pulse frame individually assigned to the lines from which the signals are respectively derived and for transmitting multiplexer pulses modulated with the sampled control or intelligence signals over the multiplexer output conductor 50 to the finder-connector links of the system. The multiplexer circuit is capable of sampling signals appearing on each of the one hundred lines of the system at a sampling repetition rate of 10 kilocycles.

The multiplexer 11 may be identical to the corresponding system component described in the copending application, Serial No. 134,974 identified above, or my copending application, Serial No. 205,641, filed on January 12, 1951, which issued on December 11, 1956, as U. S. Letters Patent No. 2,773,935. However, it will be understood that a given type of multiplexer is designed to operate with the intelligence and supervisory signal channels of a given type of line circuit. Thus, the type of line circuit disclosed in copending application, Serial No. 134,974, is adapted to supply the intelligence and control signals over the same conductor to the corresponding gate tube of the multiplexer 11, whereas in the copending application, Serial No. 205,641, the intelligence and control signals are supplied over separate paths to separate control grids of the corresponding gate tube in the multiplexer 11. Since the intelligence and supervisory signal channels of the line circuits of the present invention are of the latter type, it will be understood that a multiplexer of the type shown in copending application, Serial No. 205,641, is to be used with this line circuit. However, it will be understood that either type of line circuit and multiplexer combination may be employed insofar as the restricted service facilities of the present invention are concerned.

*Finder 12a*

As previously explained in connection with Fig. 2A of the drawings, this finder comprises a pulse input circuit 200, the +B switching circuit 201, the finder pulse and busy pulse combining circuit 202, the tens coincidence tube circuit 203, the units coincidence tube circuit 204, the finder pulse forming circuit 205 and the self allotting circuit 206. The functions performed by this finder and the identical components thereof, are also generally described above with reference to the same figure of the drawings.

The pulse input circuit 200, the +B switching circuit 201, the finder pulse and busy pulse combining circuit 202, and the finder pulse forming circuit 205 may be substantially identical to the corresponding system components shown in any one of the copending applications, Serial No. 134,974, Serial No. 205,641, referred to above, or my copending application, Serial No. 257,712, filed November 23, 1951, and assigned to the same assignee as the present invention, and accordingly a detailed description of these component circuits of the finder 12a is considered unnecessary herein. With regard to the self-allotting circuits 206, this circuit may be identical with the corresponding circuit element shown in the copending application, Serial No. 257,712, or in the alternative a link allotter circuit such as shown in copending applications, Serial No. 134,974 and Serial No. 205,641 may be employed and reference may be had to these copending applications for a detailed description of the operation of these allotting circuits.

In the illustrated embodiment of the present invention the finder 12a is shown as controlled by positive tens and units pulses which are supplied to the tens coincidence tube circuit 203 and the units coincidence tube circuit 204. Accordingly, in the illustrated embodiment of the present invention the tens coincidence tube circuit 203 and the units coincidence tube circuit 204 of the finder 12a are of the improved type shown in my copending application, Serial No. 292,676 which was filed on June 10, 1952, and issued on December 11, 1956, as U. S. Letters Patent No. 2,773,982, and is assigned to the same assignee as the present invention and reference may be had to this copending application for a detailed description of these improved coincidence tube circuits. However, it will be understood that coincidence tube circuits such as shown in copending applications Serial No. 134,974, Serial No. 205,641, and Serial No. 257,712 may be employed, in which case negative tens and units pulses are supplied from the tens and units pulse rings 21 and 20 to the respective coincidence tube circuits.

*Connector 12b*

As explained generally in connection with Figs. 2B and 2C of the drawings, this connector as well as the other connector of the system generally comprises the calling and called line in gate circuits 207 and 223, calling and called line out gate circuits 226 and 224, calling and called line reconstruction circuits 208 and 222, a dial impulse integrator circuit 209, tens, units and party register pulsers 210, 214, 263, tens units and party inverter circuits 260, 261 and 262, tens, units and party sequence timing circuits 212, 216 and 264 and tens, units and party digit registers 211, 215 and 265. Connector 12b is also diagrammatically illustrated in Figs. 2B and 2C of the drawings as comprising tens, units and party register advancers 280, 281 and 282, connector pulse forming circuit 217, a busy test circuit 218, a busy lock circuit 219, a busy gate circuit 220, a ring trip circuit 221, a trunk hunting control circuit 283, a conversation timing warning tone circuit 284, a code start circuit 268, supervisory tone gate circuits 225 and a conversation timing control circuit 285. The connector 12b also includes the restricted service gate circuits 197 and 198 which are employed to condition the connector 12b to give the particular type of service as described generally heretofore. The functions performed by the connector and the above identified components thereof are also generally described above with reference to Figs. 2B and 2C of the drawings.

Figure 7:
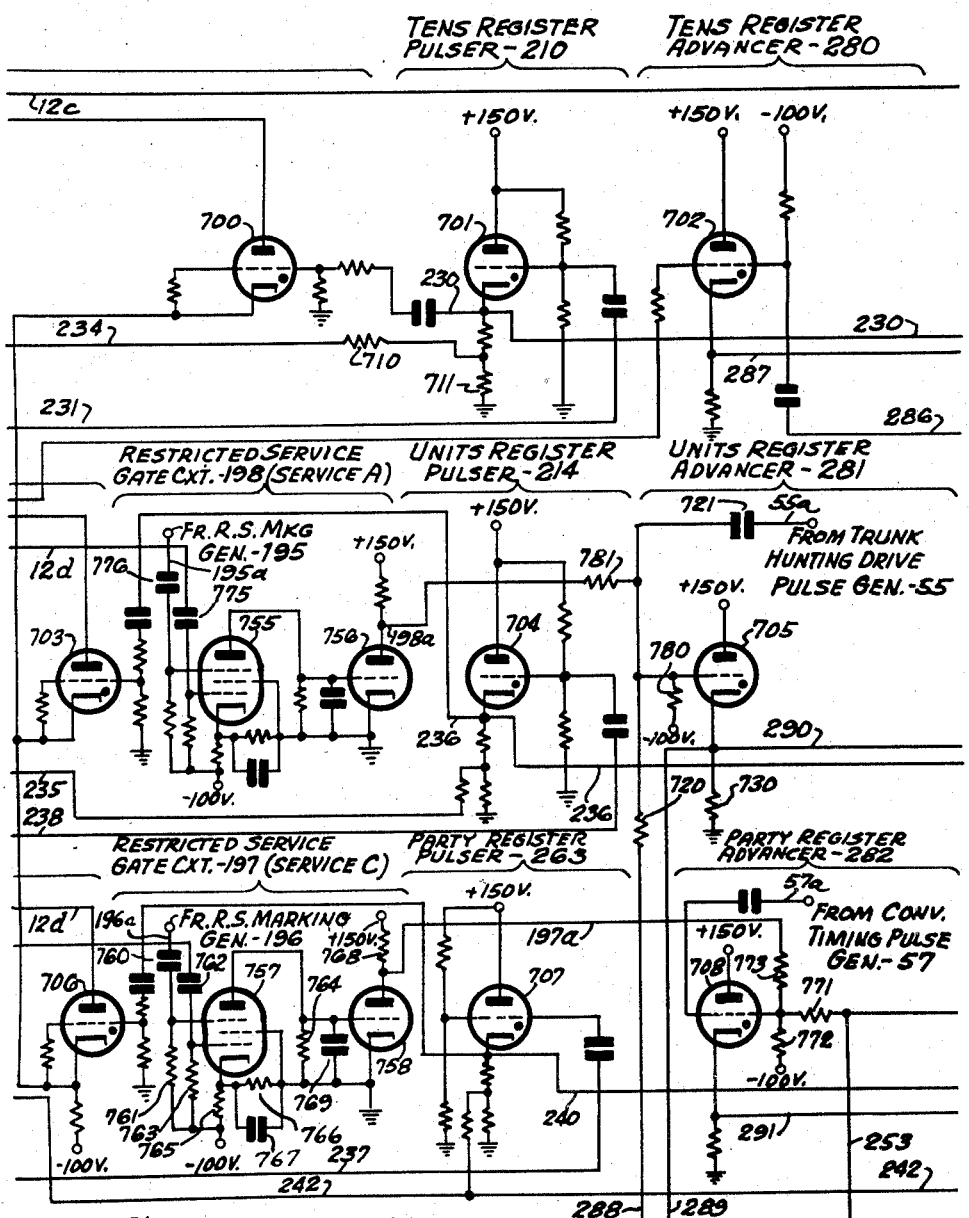
Figure 8:
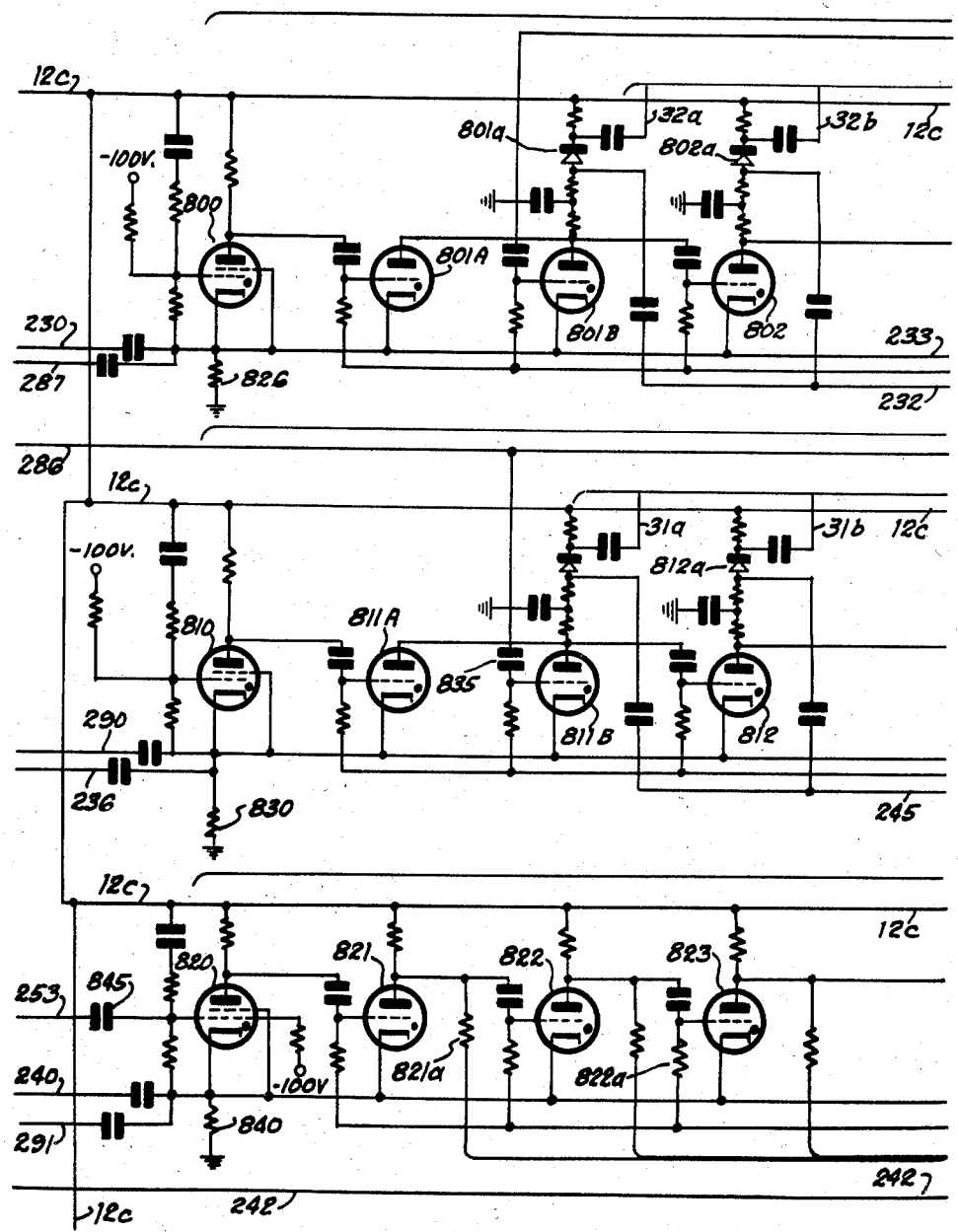
Figure 10:
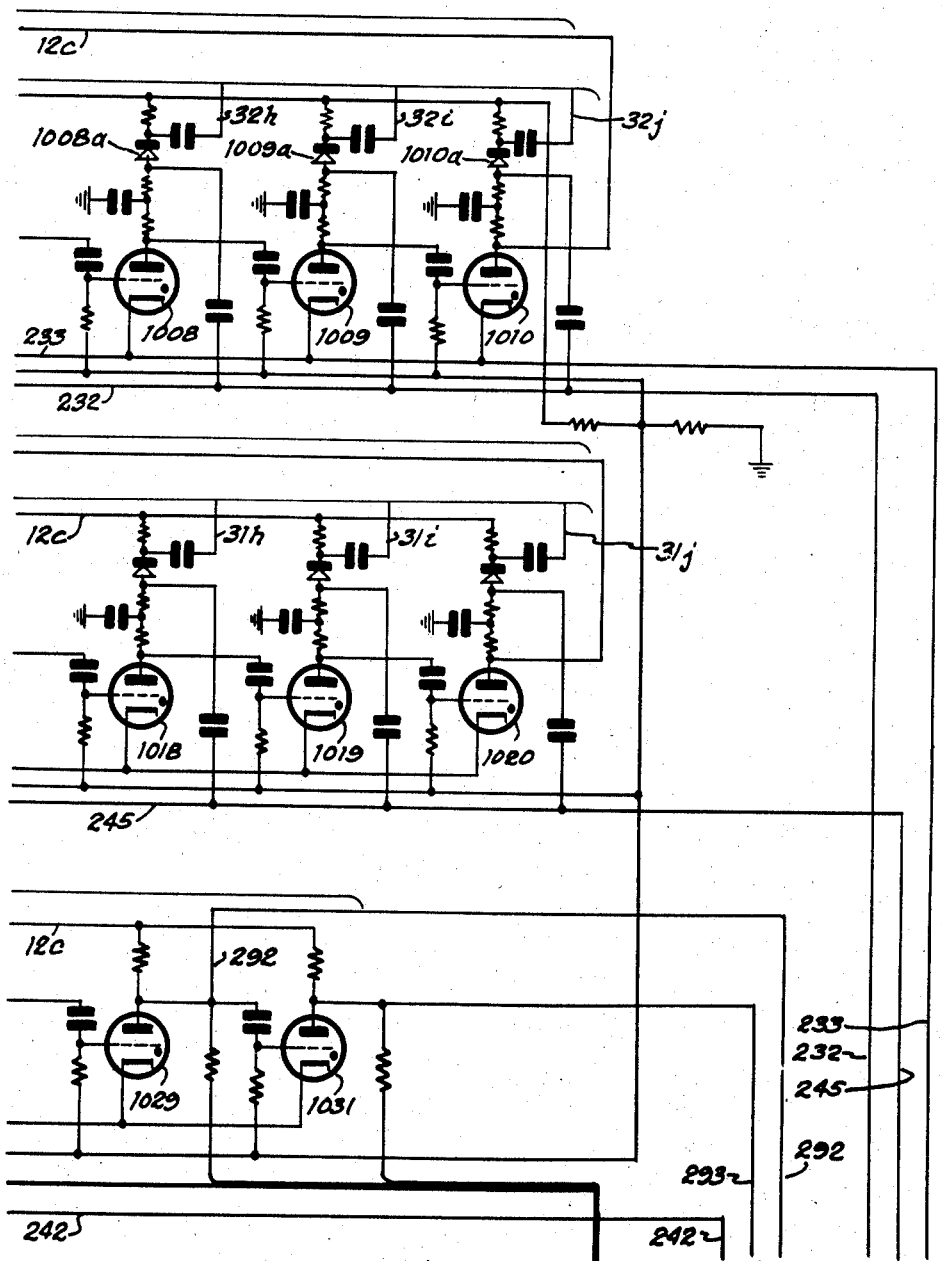
Figure 13:
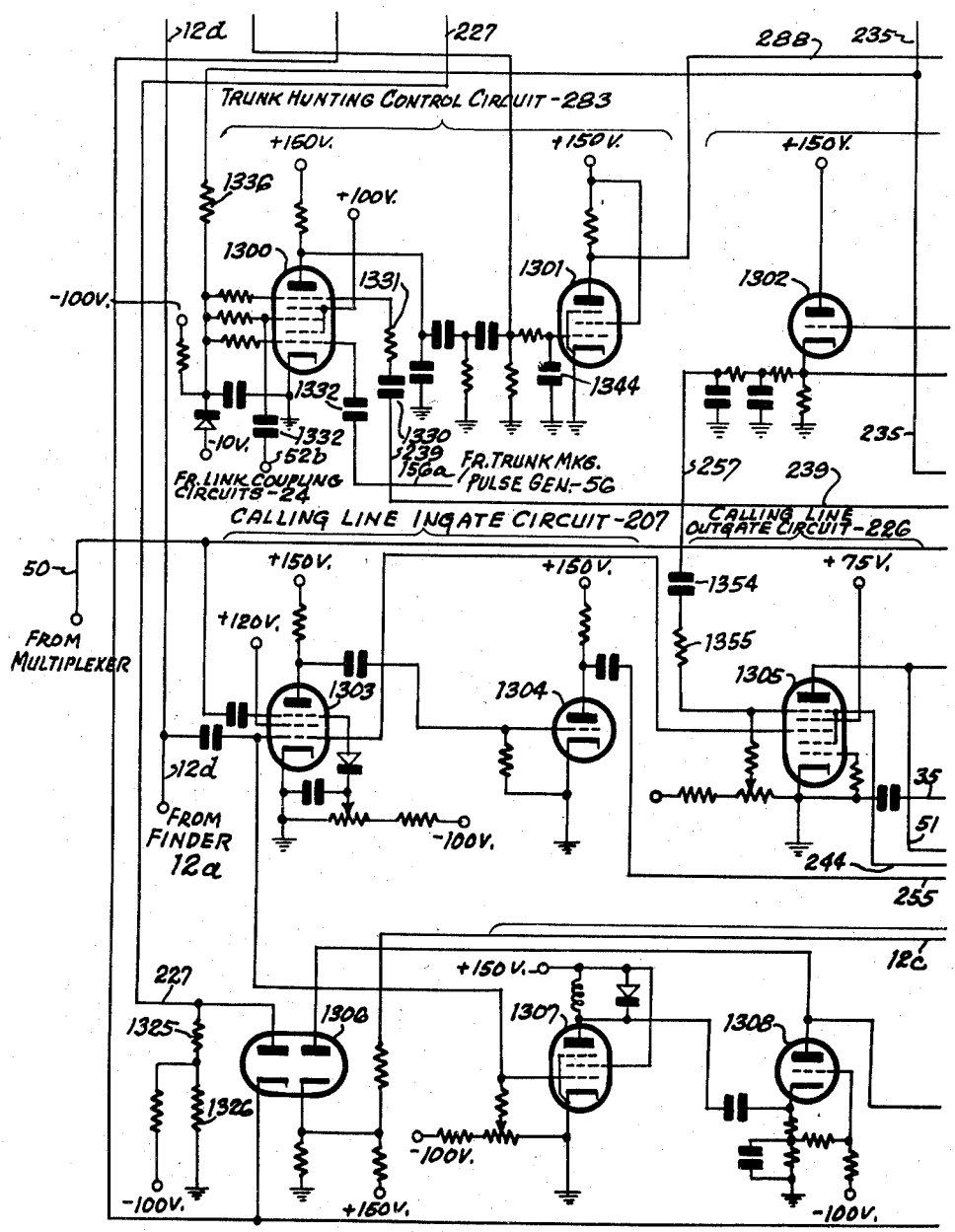
Figure 15:
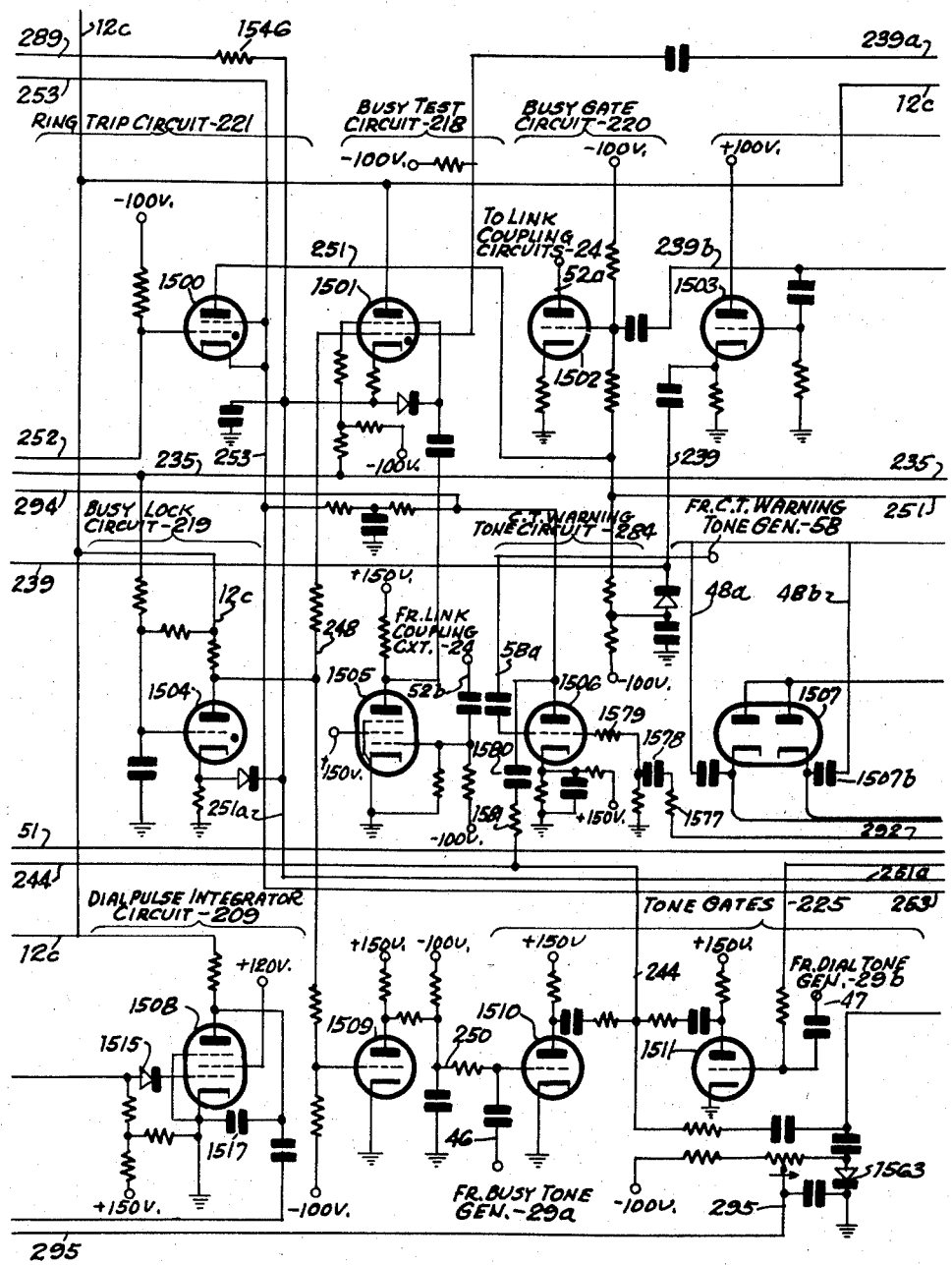
Figure 17:
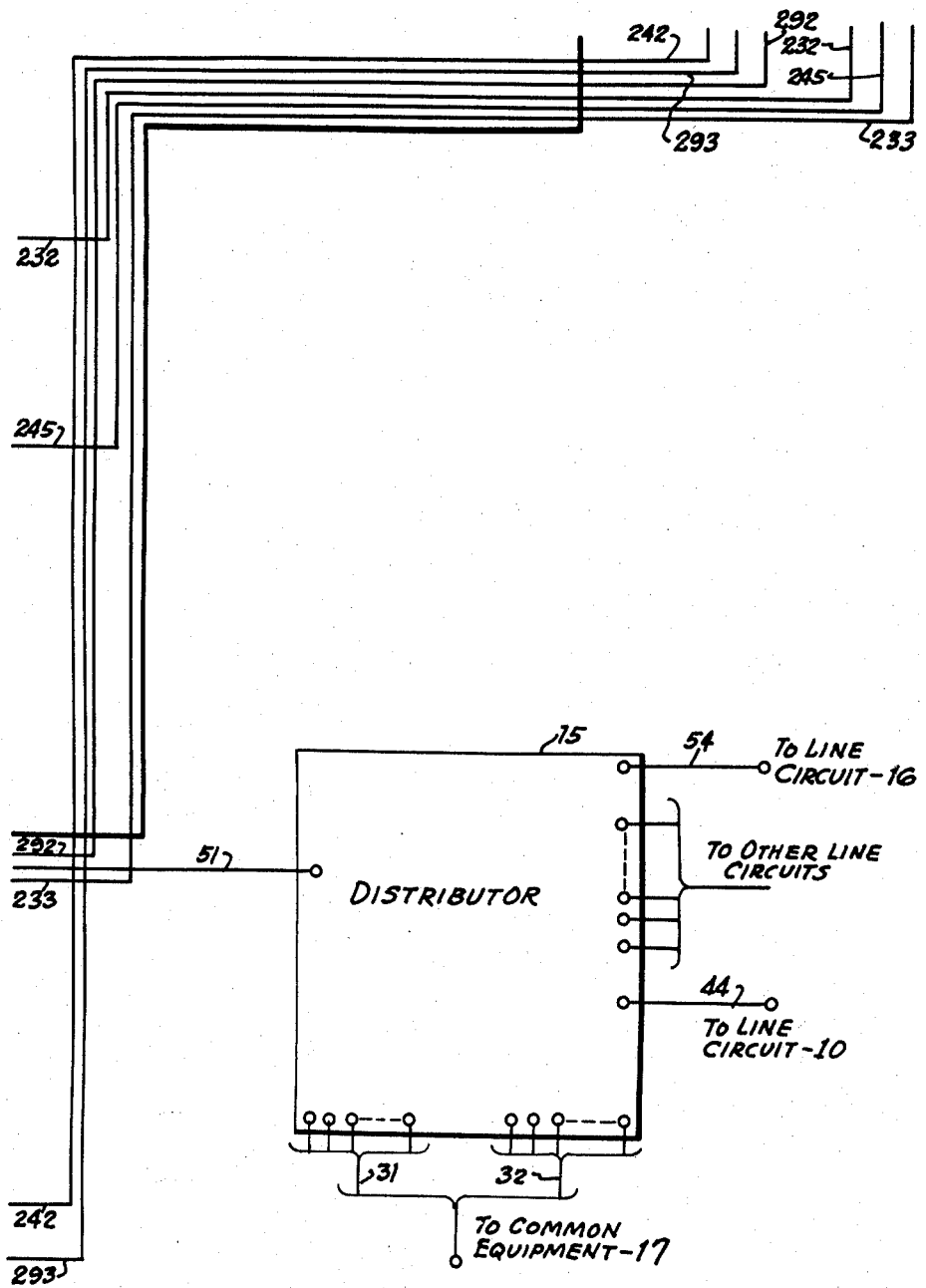

Referring now more particularly to Figs. 6 to 10, inclusive, and 13 to 17, inclusive, wherein the detailed circuitry of the connector 12b is shown, it will be readily understood that details of this connector will best be understood in terms of the functional significance of the various components thereof. In order to correlate these figures with the schematic showing of the Figures 2B and 2C, it may be pointed out that the tens, units, and party inverters 260, 261, and 262 are shown in Fig. 6 as respectively including the inverter tubes 600, 603, and 606, the tens sequence timing circuit 212 is shown in Figs. 6 and 7 as comprising a start tube 601, a timing tube 602, and a condenser discharge tube 700, the units sequence timing circuit 216 is shown in Figs. 6 and 7 as comprising a start tube 604, a timing tube 605, and a condenser discharge tube 703, and the party sequence timing circuit 264 is shown in Figs. 6 and 7 as comprising a start tube 607, a timing tube 608, and a condenser discharge tube 706. The tens register pulsers 210, 214, and 263 are shown in Fig. 7 of the drawing as respectively including the pulser tubes 701, 704, and 707. The tens, units, and party register advancers 280, 281, and 282 are shown in Fig. 7 of the drawings as respectively including the pulser tubes 702, 705 and 708. The restricted service gate circuit 197 is shown in Fig. 7 of the drawings as including the gate tube 757 and the control tube 758 and the restricted service gate circuit 198 is shown in Fig. 7 of the drawings as comprising the gate tube 755 and the control tube 756. The tens digit register 211 is shown in Figs. 8, 9 and 10 of the drawings as including the primer tube 800, the parallel connected impulse counting tubes 801A and 801B which together comprise the first impulse counting stage and nine other impulse counting tubes 802, 903–907, inclusive, and 1008–1010, inclusive. The unit digit register 215 is shown in Figs. 8, 9 and 10 as comprising the primer tube 810, the parallel connected tubes 811A and 811B which together comprise the first impulse counting stage, and nine other impulse counting tubes 812, 913–917, inclusive, and 1018–1020, inclusive. The party digit register 265 is shown in Figs. 8, 9, 10, 15 and 16 of the drawings as comprising the primer tube 820, ten impulse counting tubes 821–823, inclusive, 924–928, inclusive, 1029 and 1030, and five double diode gate tubes 1507 and 1603–1606, inclusive. The trunk hunting control circuit 283 is shown in Fig. 13 of the drawings as comprising the trunk hunting control tube 1300 and the trunk hunting inverter tube 1301, the calling line in gate circuit 207 is shown in Fig. 13 of the drawings as comprising the gate tube 1303 and the inverter 1304, the called line reconstructor circuit 222 is shown in Figs. 13 and 14 of the drawings as comprising a peaker tube 1402, a condenser discharging tube 1401, a condenser charging tube 1400, and a cathode follower output tube 1302, the calling line out gate circuit 226 is shown in Fig. 13 of the drawings as comprising a single triple grid gate tube 1305, the calling line reconstructor circuit 208 as shown in Figs. 13 and 14 of the drawings as comprising the peaker tube 1307, the condenser discharge tube 1308, the condenser charging tube 1406, a clamping diode including the right-hand section of the duo-diode 1306 and a cathode follower tube 1407, the called line out gate circuit 224 is shown in Fig. 14 of the drawings as comprising the single triple grid gate tube 1403, the called line in gate circuit 223 is shown in Fig. 14 of the drawings as comprising the gate tube 1404 and the inverter tube 1405, the ring trip circuit 221 is shown in Fig. 15 of the drawings as comprising the ring trip tube 1500, the busy test circuit 218 is shown in Fig. 15 of the drawings as comprising the busy test tube 1501 and the inverter tube 1505, the busy lock circuit 219 is shown in Fig. 15 of the drawings as comprising the busy lock tube 1504 and the inverter tube 1509, the dial impulse integrator circuit 209 is shown in Figs. 15 and 13 as comprising the dial impulse integrator tube 1508 and a diode clamping tube comprising the left-hand section of the duo-diode 1306, the busy gate circuit 220 is shown in Fig. 15 of the drawings as comprising the gate tube 1502, and the connector pulse forming circuit 217 is shown in Figs. 15 and 16 of the drawings as comprising a connector pulse mixer tube 1602, a connector pulse sharpening tube 1601, an inverter tube 1600, and a cathode follower output tube 1503. The conversation timing warning tone circuit 284 is shown in Fig. 15 as comprising the gate tube 1506, the tone gate circuits 225 are shown in Figs. 15 and 16 as comprising the busy tone gate tube 1510, the dial tone gate tube 1511 and the ringback tone gate tube 1607, the code start circuit 1508 is shown in Fig. 16 as comprising the code start tube 1608, and the conversation timing control circuit 285 is shown in Fig. 16 as comprising the control tube 1610.

The manner in which the identified tubes of the connector are interconnected is pointed out more fully below with reference to the operation of the individual circuits. Although the identified tubes may be of any desired commercial type having the required operating characteistics, it is pointed out that preferably the tubes 600, 603, 606, 1400, 1401, 1308, and 1406 are duo-diode triodes of the commercial type 6AQ6, the tubes 756 and 758, 1302, 1304, 1407, 1405, 1509, 1506, 1510, 1511, 1502, and 1503 are triodes of the commercial type 604, the tube 1601 is a double triode of the commercial type 6J6, the tubes 755, 757, 1303, 1404, and 1602 are pentodes of the commercial type 6AS6, the tubes 1301, 1307, 1402, 1600, 1607, 1505, and 1508 are pentodes of the commercial type 6AU6, the tubes 1300, 1305, and 1403 are preferably of the RCA developmental type A5727 and are provided with three control grids each having a substantial mutual conductance with respect to the anode when operated at a potential negative with respect to the cathode, and the tubes 1306, 1507, 1603—1606, and 1609 are hot cathode duo-diodes of the commercial type 6AL5. Preferably, the gas filled thyratrons of the hot cathode type included in the connector 12b, namely the tubes 601, 604, 607, 800, 810, 820, 1500, 1501, 1608, and 1610, are of the RCA commercial type 5696. The cold cathode gas filled triodes included in the connector 12b are preferably of the RCA commercial type 5823. This group includes the tubes 602, 605, 608, 700–708, inclusive, 801A, 801B, 802, 811A, 811B, 812, 821–823, inclusive, 903–907, inclusive, 913–917, inclusive, 924–928, inclusive, 1008–1010, inclusive, 1018–1020, inclusive, 1029, 1030 and 1504.

In considering the operation of the connector 12b, it will be understood that all of the component circuits of this connector, with the exception of the restricted service gate circuits 197 and 198 are substantially identical to the corresponding circuits identified by the same reference numerals in the connector disclosed and described in detail in my copending application Serial No. 301,215 identified above, so that only a general description of these circuits will be made in connection with the above described restricted service calls. However, it will be understood that certain component circuits of the connector are controlled by the restricted service gate circuits 197 and 198 so as to provide the restricted service operation described generally above. More specifically, the trunk hunting facilities and the conversation timing facilities are controlled in part by the restricted service gate circuits 198 and 197 respectively to provide for restricted service.

In considering the operation of the connector 12b, reference is again made to the first call originating at the substation B' associated with the line 32 and rounted by way of the link 12 to the called substation A associated with the line 23. From the description of this call, it will be found that when the finder-connector link 12 is idle, the finder 12a withholds operating anode potential from the conductor 12c and also withholds finder gate pulses from the conductor 12d. Immediately the finder 12a is associated with the calling line 32, the +B switching circuit 201 thereof operates to impress a positive potential of one hundred and forty volts on the conductor 12c and almost immediately thereafter, functions to impress finder gate pulses upon the conductor 12d in the time position 63c assigned to the calling line 32. When this occurs, the priming tubes 800, 810, and 820 in the registers 211—215 and 265 respectively are fired to prevent these registers from firing prematurely in response to extraneous transients produced on the line before the dialing operation is initiated. Also, the dial tone gate tube 1511 is rendered conductive so that the dial tone signal is transmitted to the calling subscriber at the substation B' to signal him that the dialing operation may be started.

Considering now the operation of the restricted service gate circuit 197 in the connector 12b, it will be recalled from the general description of the system that this circuit controls in part the party register advancer 282 whereby the conversation timing facilities may be enabled under the joint control of the restricted service gate circuit 197 and the ring trip circuit 221 if the calling line is a member of the service C group and if the call is answered at the called line. More particularly, the restricted service marking pulses which are developed by the generator 196 on the conductor 196a are transmitted through the condenser 760 to the suppressor grid of the restricted service gate tube 756, this control grid being connected to the minus one hundred volt supply through the resistor 761. The finder gate pulses developed on the conductor 12d in the finder 12a in the manner described above are coupled through the condenser 762 to the first control grid of the gate tube 757, this control grid being connected through the resistor 763 to the minus one hundred volt supply. The cathode of the tube 757 is operated at a potential negative with respect to ground and the anode of the tube 757 is connected to ground through the resistor 764 so that direct coupling from the anode of the tube 757 to the control grid of the tube 758 is provided, the cathode of the tube 757 being connected to the minus one hundred volt supply through the resistor 765 and through the resistor 766 to ground. The by pass condenser 767 is connected across the resistor 766 to maintain the correct bias conditions for the tube 757. The screen grid of the tube 757 is connected directly to ground. Since the first control grid and suppressor grid of the tube 757 are operated at negative potentials with respect to the cathode of the tube 757, this tube is normally nonconductive so that no current flows through the anode resistor 764 thereof and the control grid of the tube 758 is operated at zero bias with the result that a large current flows through the anode resistor 768 of this tube and the anode potential thereof is normally at a relatively low value. Accordingly, the potential on the conductor 197a is normally at a relatively small positive value when the gate tube 757 is not conducting.

It will be recalled from the description of the generator 196 that this generator develops restricted service marking pulses on the conductor 196a in the pulse time positions assigned to the lines numbered 30 to 55, inclusive, and hence, develops restricted service marking pulses in the time position 63c assigned to the calling line 32. Accordingly, the finder gate pulses which are developed on the conductor 12d in the time position 63c coincide with the above described restricted service marking pulses on the conductor 196a and during such coincidence, tube 757 is rendered conductive so that current flows through the anode resistor 764 thereof. The condenser 769 is connected across the anode resistor 764 so as to provide some filtering action with the result that the bias potential on the tube 758 is increased negatively when the gate tube 757 conducts and the anode potential of the tube 758, i. e., the potential on the conductor 197a, increases positively as the tube 758 is biased in the negative direction. Since the coincidence between the finder gate pulses on the conductor 12d and the restricted service marking pulses on the conductor 196a continue so long as the finder 12a remains operatively associated with the calling line 32, the potential on the conductor 197a remains at the above described relatively high positive value for the duration of the call. It will also be understood that the above described operation of the restricted service gate circuit 197 takes place as soon as the finder gate pulses are developed on the conductor 12d, although the controlling potential increase on the conductor 197a may not be used for any desired control purposes as soon as the link 12 is seized.

The connector 12b responds to the first two digits of dial impulses which are dialed into this connector by selecting the time position assigned to the called line 23 and also to the third digit dialed into this connector by selecting the party line ringing signal assigned to the called substation A having the directory number designation "231" assigned thereto. During the open circuit period of each dial impulse, the transmission of the multiplexer pulses 83c over the conductor 50 to the in gate circuits 223 and 207 in the connector 12b, is interrupted. The dial impulse signals thus modulated on the multiplexer pulses 83c are reconstructed across the storage condenser 1410 in the calling line reconstruction circuit 208 and are transmitted by way of the cathode follower output tube 1407 in the circuit 208 and the clipping rectifier 1515 to the dial impulse integrator tube 1508 so as to develop corresponding saw tooth impulses across the shunt connected condenser 1517 in the anode circuit of the tube 1508. The corresponding control impulses developed across the resistors 1325 and 1326 and then transmitted by way of the conductor 227, the tens inverter tube 600 and the conductor 231 to the tens sequence from the circuit 212 and the tens register pulser 210. As a result the pulser 210 develops corresponding register drive pulses across the resistor 826 so that the register 211 is driven to a setting wherein the second tens gating tube 802 is rendered conductive and the rectifier 802a is opened so that the tens pulses appearing on the conductor 32b are connected to the conductor 232 and the tens pulse time position of the called line 23 is registered. During the interdigit pause which separates the first and second digits the tens sequence timing tube 602 is fired and develops a positive potential on the conductor 234 which is impressed upon the resistors 710 and 711 so as to prevent the pulser tube 701 from responding to further control pulses. The potential on the conductor 234 also enables the units inverter tube 603 so that the three control impulses developed by the circuit 209 during the second digit are transmitted through the tube 603 and over the conductor 238 to the units register pulser tube 704. The tube 704 responds to these three control impulses by developing corresponding register drive pulses across the resistor 830 so that the units digit register 215 is driven to a setting wherein the third gating tube 813 thereof, is rendered conductive and the rectifier 813a is opened so that units pulses appearing upon the conductor 31c and connected to the conductor 245 and the units pulse timing position of the called line 23 is registered. The connector pulse forming circuit 217 responds to the tens pulses on the conductor 233 and the units pulses on the conductor 245 by developing a connector pulse in the time position 64b assigned to the called line 23.

During the interdigit pause which separates the second and third digits the units sequence timing tube 605 is fired so that the positive potential developed on the conductor 235 is also impressed on the trunk hunting control circuit 283, the busy lock circuit 219 and the busy test circuit 218 to enable these circuits to perform their intended functions. The party inverter tube 606 is also enabled by the potential developed on the conductor 235 so that the control pulses developed by the circuit 209 during the dialing of the third digit are transmitted through the tube 606 and over the conductor 237 to the party register pulser tube 708 and the party sequence timing circuit 264. The tube 707 responds to the single impulse constituting the third digit by developing the corresponding register drive pulse across the resistor 840 in the party digit register 265 so that the first counting tube 821 thereof, is fired and the code #1 party line ringing signal (Fig. 11(13)), assigned to the substation A is transmitted over the conductor 275 to the ring back tone gate tube 1607.

If the called line 23 is idle, busy test circuit 218 functions to develop a cut-through potential on the conductors 251 and 251a and the gate start tube 1608 is fired in response to the next occurring gate start pulse which is developed on the conductor 5. When the gate start tube 1608 is fired it furnishes screen potential for the ring back tone gate tube 1607 so that this tube is rendered conductive and gates therethrough the interrupted ring back tone signal appearing on the conductor 275. The ring back tone signal gated through the tube 1607 is rectified in the rectifier 1563 so as to reproduce the original party line ringing signal which is transmitted over the conductor 295 and through the resistor 1420 to the third control grid of the called line out gate tube 1403 with the result that the connector signal pulses released by this tube in the time position assigned to the called line are increased in the amplitude during the "on" intervals of the party line ringing signal assigned to the substation A and have the effect of actuating the ringing facilities at this substation so that the called line is rung during the on intervals of the selected party line ringing signal.

When the subscriber at the called substation A answers, the multiplexer 11 develops pulses on the common conductor 50 in the time position 64b assigned to the line 23 and these pulses are transmitted through the called line in gate tube 1404 and through the inverter tube 1405 to the called line reconstruction circuit 222. The circuit 222 responds to this call answering signal by developing a potential on the conductor 252 which is impressed upon the control grid of the ring trip tube 1500 so that this tube is fired. When the tube 1500 fires, a positive ring trip potential is developed on the conductor 253 which is impressed upon the cathode of the ring back tone gate tube 1607 so that this tube is turned off and the ringing operation is terminated. The potential on the conductor 253 is also used to enable the conversation timing control tube 1610 and the conversation timing warning tube 1506.

When the called line answers, the connector 12b should function to initiate the conversation timing facilities so as to limit the duration of the call if the calling line is a member of the service C group. Accordingly, the potential on the conductor 253 is coupled through the condenser 845 to the control grid of the priming tube 820 in the party digit register 265 so as to fire this tube and reset the register 265 to zero. At the same time, the potential on the conductor 253 is impressed upon the control grid of the party register advancer tube 708 through the resistor 771. This control grid is connected through the resistor 772 to the —100 v. supply and is connected through the resistor 773 to the output conductor 197a of the restricted service gate circuit 197. The values of the resistors 771, 772 and 773 are so chosen that tube 708 is held beyond the cut-off unless a large positive potential is present on both the conductor 197a and the conductor 253. Accordingly, the party register advancer tube 708, and more generally, the conversation timing facilities of the connector, is held beyond the cut-off until the called party answers and the ring trip potential is developed on the conductor 253. This is true even though the calling line is a member of the service C group and a positive potential increase is developed on the conductor 197a in the manner described heretofore. However, as soon as the called party answers and a positive potential is developed on the conductor 253, the potential on the control grid of the tube 708 is increased sufficiently in the positive direction to permit this tube to respond to conversation timing pulses impressed thereon from the conductor 57a. In this connection, it will be understood that if the calling line is not a member of the service C group and the duration of the call initiated thereon is not, therefore, limited, the potential on the conductor 197a will remain at a relatively low value which is sufficient to prevent the tube 708 from responding to conversation timing pulses even after a ring trip potential is developed on the conductor 253. Accordingly, unless the calling line is a member of the service C group, the conversation timing facilities are held inoperative for the duration of the call.

Returning now to the operation of the party register advancer 282, when the tube 708 is enabled in the manner described above, this tube responds to the conversation timing pulses appearing on the conductor 57a by developing corresponding register drive pulses across the resistor 840 in the register 265 so that this register is advanced one step for each conversation timing pulse. When the ninth counting tube 1029 in the register 265 is extinguished in response to the tenth conversation timing pulse, the potential on the conductor 292 is increased positively and this potential increase is transmitted through the resistor 1577, the condenser 1578 and the resistor 1579 to the control grid of the conversation timing warning tone gate tube 1506 so as to permit this tube to transmit the warning tone signal appearing on the conductor 58a. The gated warning tone signal is transmitted through the condenser 1580 and the resistor 1581 and over the conductor 244 to the third control grid of the calling line out gate tube 1305 so as to modulate the connector signal pulses released by this tube and inform the calling subscriber that the conversation timing period will be terminated shortly. This warning tone signal is also transmitted by way of the conductor 294, the condenser 1450 and the resistor 1451, to third control grid of the called line out gate tube 1403 so as to modulate the connector signal pulses released by this tube and inform the called line subscriber that the call is about to be terminated. When the tenth calling tube 1030 in the register 265 is extinguished in response to the eleventh conversation timing pulse, the potential on the conductor 293 is coupled through the resistor 1665 and the condenser 1666 to the control grid of the conversation timing control tube 1610. The tube 1610 is supplied with anode potential from the conductor 12c as soon as the connector 12b is rendered operative and this tube is enabled after the called line answers by the potential on the conductor 253. However, the control grid of the tube 1610 is held sufficiently beyond the cut-off so that this tube is not fired until the above described positive potential is developed on the conductor 293, at which time the tube 1610 fires and a large positive potential is developed across the cathode resistor 1670 thereof. The positive potential developed across the resistor 1670 is then coupled through the condenser 1671 and over the conductor 12e to the +B switch tube in the circuit 201 in the finder 12a and has the effect of extinguishing this tube so that the link 12 is released and the connection between the lines 32 and 23 is broken. In the alternative, the positive potential developed across the resistor 1670 may be impressed upon the cathode of the busy test tube 1501 so that this tube is extinguished and the cut-through potential is removed from the conductors 251 and 251a. When this occurs, the busy tone signal is transmitted to the calling and called subscribers to discourage further continuance of their call.

In the above described call originating on the line 32, the trunk hunting facilities in the connector 12b are held inoperative since the calling line 32 is not a member of the service A group, the lines of which group are entitled to trunk hunting or consecutive number hunting service. In this connection, it will be understood that in the illustrated call from line 32 to line 23, no question of consecutive number hunting would arise since the line 23 is not a member of one of the illustrated trunk groups. However, the calling line 32 may wish to call one of the other lines of the system, such as line 26, for example, which is a member of one of the illustrated trunk groups, in which case it would be desirable to provide the consecutive number hunting service to permit the calling line to hunt for an idle line within the called trunk group.

In considering the manner in which the trunk hunting facilities are held inoperative, it is pointed out that the restricted service gate circuit 198 functions to control the units register advancer tube 705 so that this tube is prevented from responding to trunk hunting drive pulses even though trunk hunting control circuit 283 indicates that the called line is busy and is a member of the trunk group. More particularly, the finder gate pulses appearing on the conductor 12d are coupled through the condenser 775 to the first control grid of the gate tube 755 and the restricted service marking pulses developed by the generator 195 on the conductor 195a are coupled through the condenser 776 to the suppressor grid of the tube 755. The tube 755 is connected in a manner substantially identical to that of the tube 757 as described in detail above in connection with the circuit 197, and if the finder gate pulses and restricted marking pulses appearing on the conductors 12d and 195a coincide, the tube 755 conducts and the potential on the conductor 198a is increased positively. However, in the illustrated embodiment, the calling line 32 is a member of the service C group whereas the generator 195 develops restricted service marking pulses in the time positions assigned to the lines in the service A group. As a result, the above coincidence is lacking between the finder gate pulses and the restricted service marking pulses on the conductor 195a so that the tube 755 does not conduct and the potential on the conductor 198a remains at a relative low positive value.

Considering now the manner in which the units register advancer tube 705 is controlled in part by the potential on the conductor 198a so that the trunk hunting facilities are disabled if the calling line is not a member of the service A group, it is pointed out that the control grid of the tube 705 is connected to the —100 v. supply through the resistor 780 and is connected through the resistor 781 to the output conductor 198a of the restricted service gate circuit 198. This control grid is also connected through the resistor 720 to the output conductor 288 of the trunk hunting control circuit 283. The values of the resistors 720, 780 and 781 are so adjusted that when a relatively small positive potential is present on the conductor 198a, the control grid of the tube 705 is held sufficiently beyond cut off to prevent this tube from responding to the trunk hunting drive pulse appearing upon the conductor 55a. Accordingly, the tube 705 is prevented from firing and thereby changing the setting of the units digit register 215, independently of potential changes on the conductor 288 due to the trunk hunting control circuit 283. Accordingly, even though the called line is busy and is a member of a particular trunk group, the setting of the register 215 is not changed and the busy lock circuit 219 functions at the end of the busy test interval to lock up the connector and the busy tone signal is returned to the calling subscriber to inform him that the call cannot be completed.

Considering now the second illustrated call initiated on line 23 and intended for line 32, it will be recalled that line 23 is a member of the service A group, in which group the lines are entitled to trunk hunting or consecutive number hunting service and in which the duration of the calls is not to be limited. When the calling subscriber at the substation A initiates a call, the multiplexer 11 develops multiplexer pulses on the conductor 50 in the time position 64b assigned to the line 23. Assuming that the link 12 is seized so that the finder 12a becomes operatively associated with the calling line 23, the finder 12a impresses a +B switch potential on the conductor 12c and impresses finder gate pulses occurring in the time position assigned to the line 23 on the conductor 12d. The connector 12b responds to the application of +B switch potential to the conductor 12c by returning a dial tone signal to the calling subscriber and responds to the three digits "3" "2" and "2" dialed into the connector by selecting the time position 63c assigned to the called line 32 and the code #2 party line ringing signal assigned to the called substation B' in a manner substantially identical to that described above in connection with the first illustrated call. In this connection, it will be understood that a similar call initiated on line 23 and intended for line 32 is described in detail in my copending application Serial No. 301,215 identified above and reference may be had to this copending application for a detailed description of the operation of the connector 12b in setting up this call.

Considering now the manner in which the trunk hunting facilities in the connector 12b are enabled by means of the restricted service gate circuit 198, it will be understood that when a call is initiated on the line 23, the finder gate pulses developed on the conductor 12d occur coincidentally with one of the restricted service marking pulses developed by the generator 195 and appearing on the conductor 195a since generator 195 develops restricted service marking pulses in the time positions assigned to each line in the service A group. Accordingly, the tube 755 is rendered conductive and the potential on the conductor 198a is increased to a relatively large positive value. However, until the trunk hunting control circuit 283 functions to increase the potential on the conductor 288, the units register advancer tube 705 is held sufficiently beyond cut off to prevent this tube from responding to the trunk hunting drive pulse appearing on the conductor 55a.

After the second digit is dialed into a connector, the busy test operation is performed by the circuit 218 and if the called line 32 is idle, a cut through potential is developed on the conductors 251, 251a and the call proceeds in the manner similar to that described above in connection with the first illustrated call. In such case, the potential developed on the conductor 251a is coupled through the resistor 1546 and over the conductor 289 to the cathode resistor 730 of the tube 705 so as to hold this tube well beyond cut off even though large positive potentials may be present on both of the conductors 288 and 198a. Accordingly, if the called line 32 is idle, the trunk hunting facilities are prevented from operating by means of the potential developed across the resistor 730.

If the called line 32 is busy, busy pulses will be present on the busy pulse in conductor 52b and these pulses are coupled through the condenser 1332 to the second control grid of trunk hunting control tube 1300. Also, since the line 32 is, in the illustrated embodiment, a member of a trunk group, trunk marking pulses are present on the conductor 56a in time position 63c and these trunk marking pulses are connected through condenser 1233 to the first control grid of the tube 1300. As soon as the called line time position is selected in the registers 211 and 215, connector pulses are developed on the conductor 239 by circuit 217 and these connector pulses are coupled through the condenser 1330 and the resistor 1331 to the third control grid of the tube 1300. When the busy pulses, trunk marking pulses, and connector pulses all coincide, the tube 1300 conducts so that the potential at the control grid of the tube 1301 increases negatively. As a result, the potential at the anode of the tube 1301, i. e., the potential of the conductor 288, increases so that the control grid of the tube 705 is permitted to respond to the trunk hunting drive pulses appearing on the conductor 55a. Accordingly, the tube 705 is fired in response to each one of the trunk hunting drive pulses appearing on the conductor 55a and develops corresponding register drive pulses across the resistor 830 in the units digit register 215, so that this register is advanced one time position for each trunk hunting drive pulse. The busy test operation is repeated each time the setting of the register 215 is changed and if an idle time position is selected, the busy test tube 1501 fires and the cut through potential is developed on the conductors 251 and 251a. As soon as the cut through potential is developed on the conductor 251a, this potential biases the cathode of the tube 705 well beyond cut off so that this tube is prevented from responding to further trunk hunting drive pulses independently of the potential of the conductors 198a and 288. It will, thus, be evident that trunk hunting service is provided for calling line 23 if the called line is a member of the particular trunk group and if the called line is busy. In this connection, it will be understood that in the second illustrated call, no conversation timing operation is performed since this call is initiated on the line 23 which is a member of the service A group. Accordingly, when the call is answered and a ring trip potential is developed on the conductor 253, the register 265 is reset to zero but the register advancer tube 708 is held well beyond cut off due to the relatively low potential on the conductor 197a so that the tube 708 does not respond to conversation timing pulses and the register 265 remains at zero for the duration of the call.

Considering now the third illustrated call which is initiated on the line No. 2 and intended for line 32, it is assumed that the link 12 is seized by the calling line and finder gate pulses are developed on the conductor 12d in the time position 63i assigned to this line. However, these finder gate pulses do not coincide with restricted service marking pulses on the conductor 195a or the conductor 196a so that the potentials on the conductors 197a and 198a remain at their relatively low normal values. Accordingly, both the trunk hunting facilities and the conversation timing facilities are held inoperative during the third illustrated call. However, in other respects, the connector 12b functions to set up the connection in a manner substantially identical to that described above in connection with the first illustrated call.

Distributor 15

As pointed out in the general description of the system, this circuit is provided for the general purpose of distributing signals derived from the signal sample modulated connector pulses developed in the connectors of the system in the time positions of each pulse frame respectively assigned to the calling and called lines of the system to the line circuits terminating these lines. More specifically, this circuit is capable of distributing signals derived from the signal modulated connector pulses appearing in different time positions on the common distributor channel input conductor 51 to the respective line circuits under the directive control of the connectors of the system.

The distributor 15 may be of the type described in detail in either of the above-identified copending applications, Serial No. 134,974 and Serial No. 205,641 identified above. However, it will be understood that a particular type of distributor is designed to operate with a particular type of line circuit as is described in detail in the above identified copending applications.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In an automatic telephone system, a plurality of lines having individually assigned thereto different time positions in repetitive time position frames, means including a plurality of impulse responsive links for setting up two-way communication connections between calling and called ones of said lines, and time position responsive restricted service means included in each of said links for varying the service provide by the link on a call set up therethrough in accordance with the time position assigned to the calling line operatively associated therewith.

2. In an automatic telephone system, a plurality of lines having individually assigned thereto different time positions in repetitive time position frames, line identification means for identifying certain ones of said lines as restricted service lines in accordance with the time positions individually assigned thereto, means including a plurality of impulse responsive links for setting up two-way communication connections between calling and called ones of said lines, each of said links being arranged normally to provide a first type of service on calls set up therethrough, and restricted service means controlled by said line identification means and included in each link for changing the service provided thereby to a second type of service on calls set up therethrough which originate at one of said restricted service lines.

3. In an automatic telephone system, a plurality of lines having individually assigned thereto different time positions in repetitive time position frames, said lines being arranged in two different groups having different service requirements, line identification means for identifying the lines in one of said groups in accordance with the time positions individually assigned thereto, means including a plurality of impulse responsive links for setting up two-way communication connections between calling and called ones of said lines each of said links being arranged normally to provide the service requirements of one of said groups of lines on calls set up therethrough, and means included in each link and controlled by said line identification means for changing the service provided thereby to the service requirements of the other of said groups of lines on calls set up therethrough which originate at one of the lines in said other group of lines.

4. In an automatic telephone system, a plurality of lines having individually assigned thereto different time positions in repetitive time position frames, said lines being arranged in at least two different groups having different service requirements, means including a plurality of impulse responsive links for setting up two-way communication connections between calling and called ones of said lines, means for operatively associating any idle one of said links with any calling one of said lines in the time position assigned thereto, each of said links being arranged normally to provide the service requirements of one of said line groups on calls set up therethrough, and means included in each link for changing the service provided thereby to the service requirements of the other of said line groups on calls set up therethrough which originate at one of the lines in said other line group.

5. In an automatic telephone system, a plurality of lines having individually assigned thereto different time positions in repetitive time position frames, said lines being arranged in at least two different groups one of which is restricted as to the duration of calls initiated on the lines thereof, means including a plurality of impulse responsive links for setting up two-way communication connections between calling and called ones of said lines, and time position responsive restricted service means included in each link for limiting the duration of calls set up therethrough in accordance with the time position assigned to the calling line operatively associated therewith.

6. In an automatic telephone system, a plurality of lines having individually assigned thereto different time positions in repetitive time position frames, means including a plurality of impulse responsive links for setting up two-way communication connections between calling and called ones of said lines, said lines being arranged in at least two different groups one of which is restricted as to the duration of calls initiated on the lines thereof, means including a plurality of impulse responsive links for setting up two-way communication connections between calling and called ones of said lines, means for operatively associating any idle one of said links with any calling one of said lines in the time position assigned thereto, each of said links being arranged normally to set up calls therethrough without restricting the duration of the call, and means included in each link for limiting the duration of calls set up therethrough which originate on lines within said one group of lines.

7. In an automatic telephone system, a plurality of lines having individually assigned thereto different time positions in repetitive time position frames, means including a plurality of impulse responsive links for setting up two-way communication connections between calling and called ones of said lines, said lines being arranged in at least two different groups one of which is restricted as to the duration of calls initiated on the lines thereof, line identification means for identifying the lines of said one group of lines in accordance with the time positions individually assigned thereto, means including a plurality of impulse responsive links for setting up two-way communication connections between calling and called ones of said lines, each of said links being arranged normally to set up calls therethrough without restricting the duration of the call, and means included in each link and controlled in part by said line identification means for limiting the duration of calls set up therethrough which originate on lines within said one group of lines.

8. In an automatic telephone system, a plurality of lines having individually assigned thereto different time positions in repetitive time position frames, means including a plurality of impulse responsive links for setting up two-way communication connections between calling and called ones of said lines, said lines being arranged in at least two different groups one of which is restricted as to the duration of calls initiated on the lines thereof, means for developing restricted service marking pulses in the time positions individually assigned to the lines in said one group, means including a plurality of impulse responsive links for setting up two-way communication connections between calling and called ones of said lines, each of said links being arranged normally to set up calls therethrough without restricting the duration of the call, and means included in each link and controlled in part by said marking pulses for limiting the duration of calls set up therethrough which originate on lines within said one group of lines.

9. In an automatic telephone system, a plurality of lines having individually assigned thereto different time positions in repetitive time position frames, means including a plurality of impulse responsive links for setting up two-way communication connections between calling and called ones of said lines, said lines being arranged in two groups one of which is restricted as to the duration of calls initiated on the lines thereof, means for developing marking pulses in the time positions individually assigned to the lines in one of said groups, means including a plurality of impulse responsive links for setting up two-way communication connections between calling and called ones of said lines, and means included in each link and controlled in part by said marking pulses for limiting the duration of calls set up therethrough which originate on lines within said one group of lines while permitting calls to be set up therethrough which originate on lines within the other group of said lines without restriction as to duration of the call.

10. In an automatic telephone system, a plurality of lines having individually assigned thereto different time positions in repetitive time position frames, means including a plurality of impulse responsive links for setting up two-way communication connections between calling and called ones of said lines, said lines being arranged in two groups one of which is restricted as to the duration of calls initiated on the lines thereof, means for developing marking pulses in the time positions individually assigned to the lines in one of said groups, means including a plurality of impulse responsive links for setting up two-way communication connections between calling and called ones of said lines, means for operatively associating any idle one of said links with any calling one of said lines in the time position assigned thereto, and means included in each link and controlled in part by said marking pulses for limiting the duration of calls set up therethrough which originate on lines within said one group of lines.

11. In an automatic telephone system, a plurality of lines having individually assigned thereto different time positions in repetitive time position frames, means including a plurality of impulse responsive links for setting up two-way communication connections between calling and called ones of said lines, said lines being arranged in two groups one of which is restricted as to the duration of calls initiated on the lines thereof, means for developing marking pulses in the time positions individually assigned to the lines in one of said groups, means including a plurality of impulse responsive links for setting up two-way communication connections between calling and called ones of said lines, means for operatively associating any idle one of said links with any calling one of said lines in the time position assigned thereto, conversation timing means included in each link and controlled in part by said marking pulses for releasing the link from the associated calling line at the end of a predetermined conversation period if the calling line is a member of said one group of lines.

12. In an automatic telephone system, a plurality of lines, arranged in at least two different groups having different service requirements, means including a plurality of impulse responsive links for setting up two-way communication connections between calling and called ones of said lines, line identification means common to said links for identifying the lines of one of said groups, and restricted service means included in each of said links and controlled in part by said line identification means for modifying the service provided on a call established therethrough in accordance with the service group classification of the calling line operatively associated with said one link.

13. In an automatic telephone system, a plurality of lines, arranged in at least two different groups wherein the duration of calls initiated on the lines of one of said groups is to be limited to a predetermined conversation interval, means including a plurality of impulse responsive links for setting up two-way communication connections between calling and called ones of said lines, line identification means common to said links for identifying the lines of one of said groups, and restricted service means included in each of said links and controlled in part by said line identification means for releasing the link from the calling line operatively associated therewith at the end of said conversation interval if said calling line is a member of said one group.

14. In an automatic telephone system, a plurality of lines having individually assigned thereto different time positions in repetitive time position frames, said lines being arranged in at least two different groups in which the duration of calls initiated on the lines of one of said groups is to be limited to a predetermined conversation interval, means including a plurality of impulse responsive links for setting up two-way communication connections between calling and called ones of said lines, means common to said links for developing marking pulses in the time positions assigned to the lines in one of said groups, means included in each of said links for operatively associating said link with a calling one of said lines and developing pulses in the time position assigned to the seized calling line, normally inactive conversation timing means in each of said links, and means in each of said links responsive to coincidence of said marking pulses and said calling line pulses for enabling said conversation timing means, whereby the duration of calls initiated on the lines of said one group is limited to said predetermined conversation interval.

15. In an automatic telephone system, a plurality of lines having individually assigned thereto different time positions in repetitive time position frames, said lines being arranged in different groups having different service requirements, means including a plurality of impulse responsive links for setting up two-way communication connections between calling and called ones of said lines, means common to said links for developing a first group of marking pulses in the time positions assigned to the lines in one of said groups, means common to said links for developing a second group of marking pulses in the time positions assigned to the lines in another of said groups, means included in each link for operatively associating the link with a calling one of said lines and developing pulses in the time position assigned to the seized calling line, means including a first restricted service gate circuit in each link controlled by said first group of marking pulses for developing a first control potential when said seized calling line pulses occur in coincidence with one of said first group of marking pulses, means including a second restricted service gate circuit in each link controlled by said second group of marking pulses for developing a second control potential when said seized calling line pulses occur in coincidence with one of said second group of marking pulses, and restricted service means in each link controlled by said first and second control potentials for restricting the service provided for calls completed through the link in accordance with the service group classification of the calling line operatively associated with said one link.

16. In an automatic telephone system, a plurality of lines having individually assigned thereto different time positions in repetitive time position frames, means including a plurality of impulse responsive links for setting up two-way communication connections between calling and called ones of said lines over different paths, and time position responsive restricted service means included in each of said links for denying the link access to certain ones of said paths in accordance with the time position assigned to the calling line operatively associated with the link.

References Cited in the file of this patent

UNITED STATES PATENTS

| | | |
|---|---|---|
| 2,490,833 | Ransom | Dec. 13, 1949 |
| 2,647,163 | Lomax | July 28, 1953 |